United States Patent [19]

Tsuji et al.

[11] Patent Number: 4,998,809
[45] Date of Patent: Mar. 12, 1991

[54] IMAGE-STABILIZING OPTICAL DEVICE

[75] Inventors: Sadahiko Tsuji; Hiroyuki Hamano, both of Kanagawa; Hirokazu Mogi, Saitama; Shigeru Ogino, Tokyo; Kazuhiro Noguchi, Kanagawa; Takashi Kobayashi, Tokyo, all of Japan

[73] Assignee: Canon Kabushiki Kaisha, Tokyo, Japan

[21] Appl. No.: 490,471

[22] Filed: Mar. 8, 1990

[30] Foreign Application Priority Data

Mar. 11, 1989 [JP] Japan .................................. 1-58669
Mar. 11, 1989 [JP] Japan .................................. 1-58670
Mar. 11, 1989 [JP] Japan .................................. 1-58671
Mar. 14, 1989 [JP] Japan .................................. 1-61284
Mar. 14, 1989 [JP] Japan .................................. 1-61285
Mar. 14, 1989 [JP] Japan .................................. 1-61286
Mar. 14, 1989 [JP] Japan .................................. 1-61287
Mar. 14, 1989 [JP] Japan .................................. 1-61288

[51] Int. Cl.$^5$ ........................ G02B 27/64; G02B 7/02
[52] U.S. Cl. .................................. 350/500; 350/252; 350/255
[58] Field of Search ................ 350/500, 252, 255

[56] References Cited

U.S. PATENT DOCUMENTS 2,959,088 11/1960 Rantsch .............................. 350/500
3,942,862 3/1976 Furukawa et al. ................. 350/500
3,944,324 3/1976 Tajima et al. ....................... 350/500
3,953,106 4/1976 Furukawa et al. ................. 350/500
4,013,339 3/1977 Ando et al. ......................... 350/500

Primary Examiner—Bruce Y. Arnold
Assistant Examiner—James Phan
Attorney, Agent, or Firm—Fitzpatrick, Cella, Harper & Scinto

[57] ABSTRACT

An image-stabilized optical device comprising, from front to rear, a first lens group of negative power, a second lens group of positive power and a rear lens group of positive power for forming an image, wherein the second lens group rotates around a point which is on the optical axis away from its rear principal point rearward by a distance of about $\beta 2 \cdot f1/(1-\beta 2)$ where $\beta 2$ is the image magnification of the second lens group and f1 is the focal length of the first lens group, and lies within the rear lens group, whereby the image is stabilized against accidental vibrations.

8 Claims, 36 Drawing Sheets

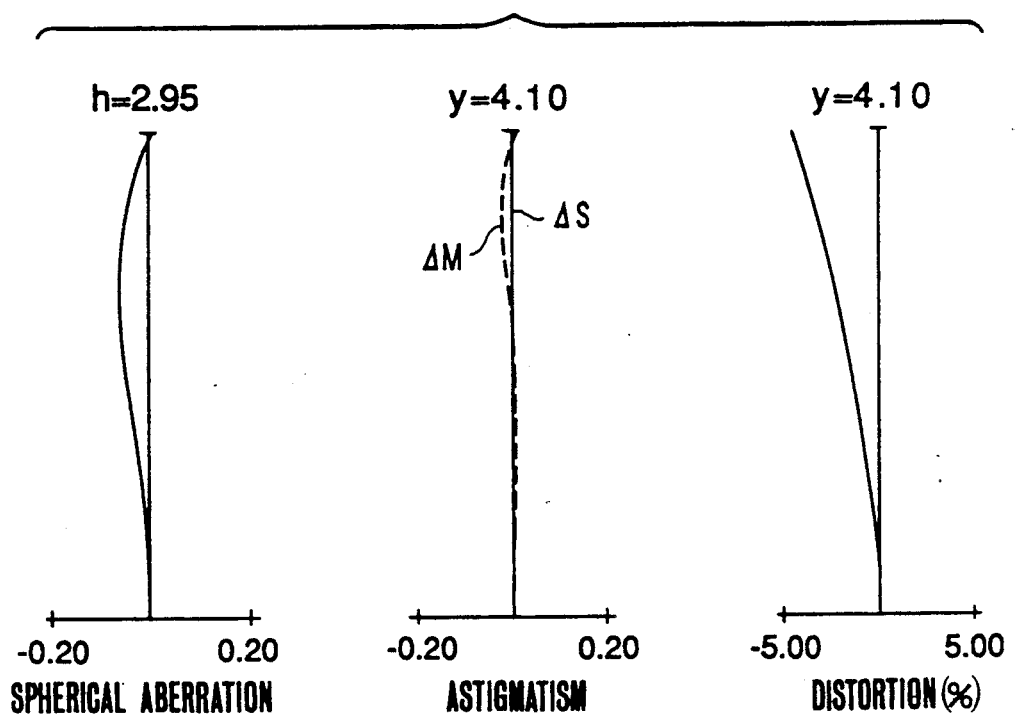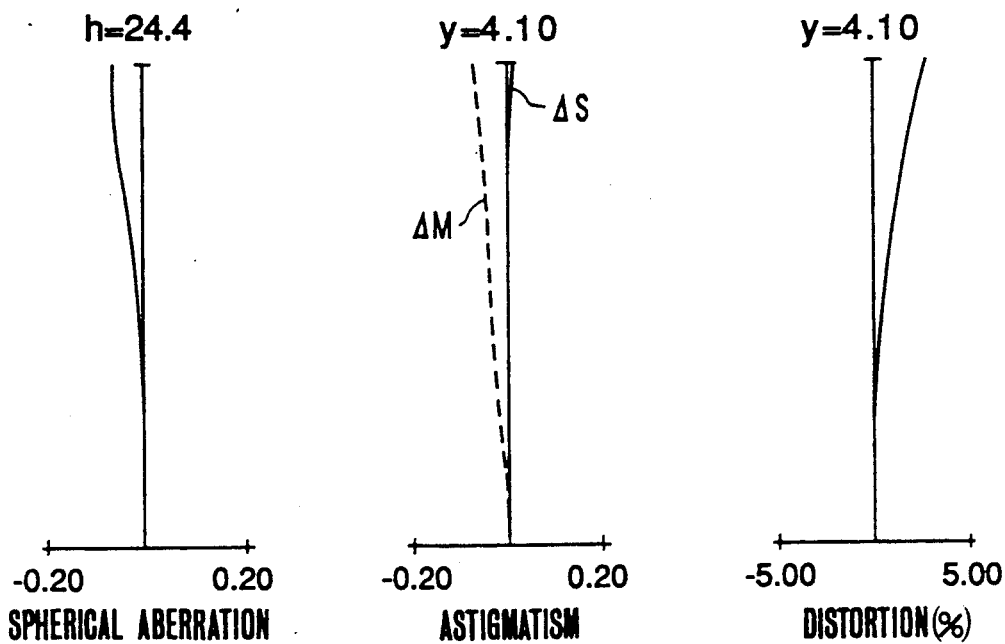

IMAGE-STABILIZING OPTICAL DEVICE

BACKGROUND OF THE INVENTION

1. Field of the Invention:

This invention relates to a device for stabilizing an image and, more particularly, to an image-stabilizing optical system arranged in front of a photographic system to optically compensate for the shake of a photographic image caused by the vibration (tilting) of the photographic system, so that a stationary image is obtained, thus achieving stabilization of the image when shooting. Still more particularly it relates to image-stabilizing optical systems suited to cameras for photography, video cameras, etc..

2. Description of the Related Art:

When shooting from a running car, flying aircraft, or other moving vehicle, vibrations propagate to the photographic system, causing the photographic image to shake.

To prevent the photographic image from shaking, a wide variety of image stabilization optical systems have been proposed.

For example, Japanese Patent Publication No. Sho 56-21133 shows an optical device responsive to the signal output from a sensor for detecting the vibrated state for moving an optical member constituting part of the photographic lens in such a direction as to cancel the accidental deflection of an image caused by the vibration when achieving stabilization of the image.

Japanese Laid-Open Patent Application No. Sho 61-223819 employs a variable-angle prism of the refractive type arranged at the frontmost position in constructing a photographic system so that the vertex angle of the refractive type variable-angle prism varies in correspondence to the displacement of the photographic system from the line of sight to thereby deflect the image, thus stabilizing the image.

Japanese Patent Publications Nos. Sho 56-34847 and Sho 57-7414 provide the photographic system with an optical member held in fixed spatial alignment with the line of sight against vibrations so that, as vibrations occur, a prism effect is produced by this optical member to deflect the line of sight rays through such an angle as to stabilize the image at the focal plane.

There is another method of stabilizing the image by moving part of the photographic system, or a lens group, in directions orthogonal to the optical axis through the proper distance derived from the output signal of an acceleration sensor for detecting vibrations of the photographic system.

Besides these U.S. Pat. No. 2,959,088 has proposed an afocal system comprising two lens groups of which the first is of negative power and the second is of positive power, their absolute values of the focal length being equal to each other. This system is arranged in front of a telescope and, as the telescope deviates from the line of sight, the second lens group is made to rotate around its focus at which the center of gyro gimbals as the supporter therefor is placed. According to this proposal, therefore, the image-stabilizing optical system utilizes the inertia pendulum method.

In general, the use of the front type of image stabilizer for the photographic system in combination with the free support of part of the optics of the stabilizer has a problem that the resultant stabilized optical system that compensates for the accidental shake of the photographic image increases largely in size. Another problem is that the amount of shake of the photographic image to be compensated for and the required amount of movement of the freely supported lens group fall in complicated relationship to each other. Therefore, the complexity of structure of the operating mechanism for the entirety of the image-stabilizing optical system comes to increase largely.

Still another problem is that the amount of aberrations produced by the movement of the freely supported lens group, or decentering aberrations, increases largely so the optical performance is largely lowered.

For example, in the aforesaid U.S. Pat. No. 2,959,088, the freely supported lens group by the gyro gimbals, or the second lens group, is made rotatable about a point on the optical axis away from its principal point by the focal length f.

To facilitate minimization of the range of variation of aberrations with rotation of the second lens group, it is preferred to make the focal length f of the second lens group as large as possible. The use of a large value of the focal length, however, brings its center of rotation to behind the photographic system, so that, for example, the position of the counter weight becomes very far from the second lens group, thus largely increasing the size of the image-stabilizing optical system.

To achieve a reduction of the size of the system, the focal length f of the second lens group may be made small. If so, a problem arises that the decentering aberrations by the second lens group increase objectionably.

As the related art, there are U.S. Patent Applications Ser. Nos. 346,512 filed on May 2, 1989 and 407,657 filed on Sept. 15, 1989.

SUMMARY OF THE INVENTION

A first object of the present invention, as applied to an image-stabilizing optical device arranged in front of a photographic system to prevent the photographic image from shaking when the photographic system vibrates, is to achieve a simplification of the relationship of the rotation of a movable lens group with the accidental displacement of the photographic system from the line of sight.

Another or second object of the invention is to provide an image-stabilizing optical system in which decentering aberrations are well corrected by the movable lens group with the limitation of the size of the entire system to a minimum.

The image-stabilizing optical system of the invention comprises, from front to rear, a first lens group of negative power, a second lens group of positive power, and a photographic lens including a zoom section and an image forming section, wherein the second lens group is arranged in front of the photographic lens and is rotatable around and supported at a support point which lies in the interior of the photographic lens and on an optical axis thereof away from a rear principal point of the second lens group toward the image plane by a distance approximately equal to $\beta2 \cdot f1/(1-\beta2)$ where f2 is the focal length of the first lens group and $\beta2$ is the image magnification of the second lens group, so that when the photographic lens accidentally tilts, the resultant shake of the photographic image is compensated for by rotating the second lens group.

In particular, one of the features of the invention is that a holding member for holding the aforesaid second lens group is provided with a counter weight of the proper magnitude so as to take good balance with the weight of the second lens group with respect to the aforesaid support point.

BRIEF DESCRIPTION OF THE DRAWINGS

FIGS. 8(A), 8(B), 12(A), 12(B), 16(A), 16(B), 19(A), 19(B), 23(A), 23(B), 27(A), 27(B), 31(A), 31(B), 34(A), 34(B), 38(A) and 38(B) are graphic presentations of the various aberrations of the image-stabilizing optical systems respectively with the photographic system tilted 1°.

Of the aberration curves, those having the figure numbers with a suffix (A) show the states in the wide-angle end, and the others having the figure numbers with another suffix (B) show the states in the telephoto end.

DETAILED DESCRIPTION OF THE PREFERRED EMBODIMENTS

Figure 1:
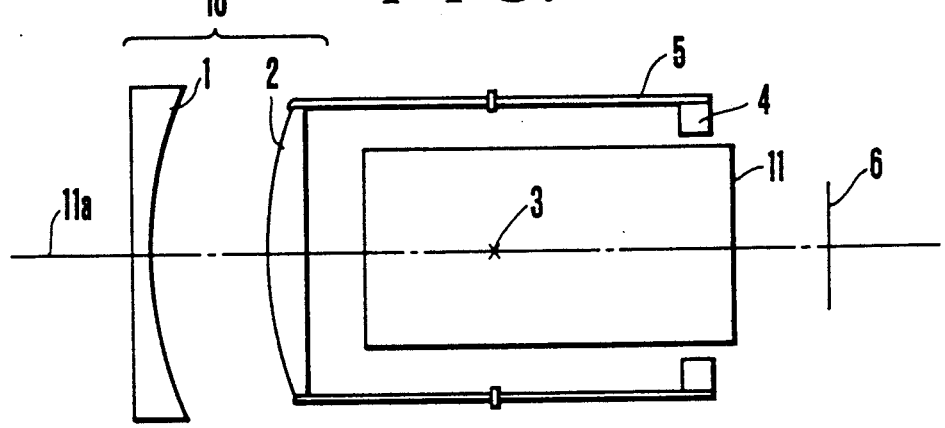
FIG. 1 is a schematic sectional view of the main parts of an embodiment of an image-stabilizing optical device attached to the front of a photographic system according to the invention.

FIG. 1 schematically shows one embodiment of an image-stabilizing optical system as obtained by attaching the image-stabilizing optical system of the invention to the front of the photographic lens (fixed focal length lens, zoom lens, etc.).

In the figure, reference numeral 10 denotes the image-stabilizing optical system attached to the front of the photographic lens 11. The image-stabilizing optical system 10 has two lens groups, i.e., from front to rear, a first lens group 1 (focal length f1) of negative refractive power and a rotatable second lens group 2 (focal length f2) of positive refractive power.

The first lens group 1 is held in a lens barrel (not shown) and is in fixed axial alignment to the photographic lens 11 (in fixed relation to the camera body). The second lens group 2 brings a virtual image of an object formed in a focal plane by the first lens group 1 into focus on a predetermined plane at a magnification $\beta 2$.

A support point 3 around which the second lens group 2 is rotated lies on an optical axis 11a away from a rear principal point of the second lens group 2 toward the image side by a distance $\beta 2 \cdot f1/(1-\beta 2)$. A holding member 5 fixedly carries the second lens group 2 at the front end thereof, the opposite end of which fixedly carries a counter weight 4 of such a magnitude as to balance with the weight of the second lens group 2. As a result, the second lens group 2 remains stationary of itself in the rotated position about the support point 3. An image plane is indicated at 6.

In the present invention, when the photographic lens 11, for example, tilts an angle $\theta$ from the line of sight, the first lens group 1 is inclined by the same angle $\theta$ together with the photographic lens 11. The second lens group 2, on the other hand, is held in fixed spatial alignment with the line of sight by means of the counter weight 4. That is, it retains its original attitude. And, the first lens group 1 and the second lens group 2 are constructed and arranged according to the aforesaid rules of design so that the second lens group 2 deflects the line of sight light rays through the same angle as the tilting angle of the photographic lens 11. In this way, a simplification of the rotation relationship is achieved. In addition, the support point 3 for rotation of the second lens group 2 is brought to as front a position as possible, thereby making it possible to compensate for the shake of the photographic image to stabilize the image, while still permitting a minimization of the size of the whole system to be achieved.

Figure 2:
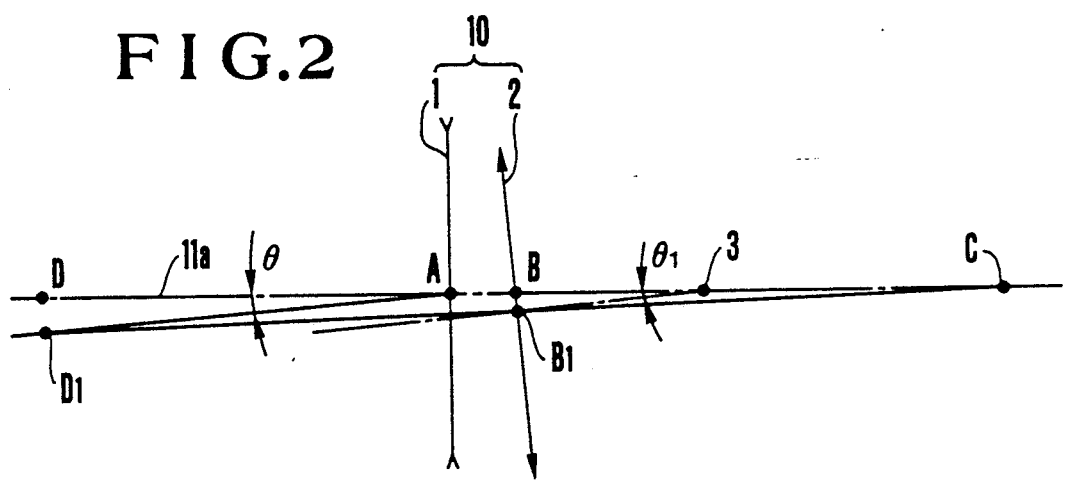
FIG. 2 and FIG. 3 are diagrams of geometry to explain the image stabilizing effect of the device of FIG. 1.

FIG. 2 is a diagram of geometry to explain the image stabilizing effect produced by the image-stabilizing optical system 10 of the character described above. In this figure, the image-stabilizing optical system is shown as the thin lens.

Now, when the photographic lens is not tilted, a point at which the first lens group 1 intersects the optical axis 11a is denoted by A and another point at which the second lens group 2 intersects the optical axis 11a is denoted by B.

When the photographic lens has tilted a minute angle $\theta 1$ upward by vibrations or the like, the first lens group 1 likewise tilts the angle $\theta 1$, but the second lens group 2 maintains the original attitude.

In FIG. 2, for the purpose of simplicity, a converse supposition is made that the photographic lens is held in fixed spatial alignment with the line of sight while the object has moved a distance subtending an angle of $-\theta 1$ degrees downward and the point B, too, has moved a distance subtending the angle of $-\theta 1$ degrees downward on a circle with its center at the support point 3 to a point B1 (where $\overline{B,B1} = \beta 2 \cdot f1 \cdot \theta 1/(1-\beta 2)$).

Let us here consider the imaging state in a point C at the center of the area of the picture frame. In the initial condition without vibrations, the object lies at a point D on the optical axis 11a. For the tilted state, as the ray tracing is reversed from the point C, a ray connecting the point C with the point B1, because of not being subjected to refraction, goes straight, aiming at a point D1 deviated downward from the rear focus position of the first lens group 1, that is, the object position D of the second lens group 2. Here, since $\overline{BC} = (1-\beta 2) \cdot f2$, and $DC = (2-\beta 2 - (1/\beta 2)) \cdot f2$, we have $D,D1 = B,B1 \cdot DC/BC = -f1 \cdot \theta 1$.

This ray then travels through the first lens group 1. Since the point D1 is at a distance of $f1\,\theta 1$ from the optical axis 11a on the image-side focal plane of the first lens group 1, the ray emerges from the first lens group 1 in parallel with the optical axis 11a. For the tilting of $\angle D \cdot A \cdot D1 = \theta$, the equation for image formation: $\overline{D,D1} = f1 \cdot \theta$ gives $\theta = -\theta 1$.

In short, the emerging ray goes in parallel with the same direction to the object as that in the initial condition. This means in the reversed sense that regardless of the tilting of the photographic lens, the image of the object does not shift from the point C at the center of the area of the picture frame.

Let us next consider the image-stabilization at any other point than the picture frame center.

Figure 3:
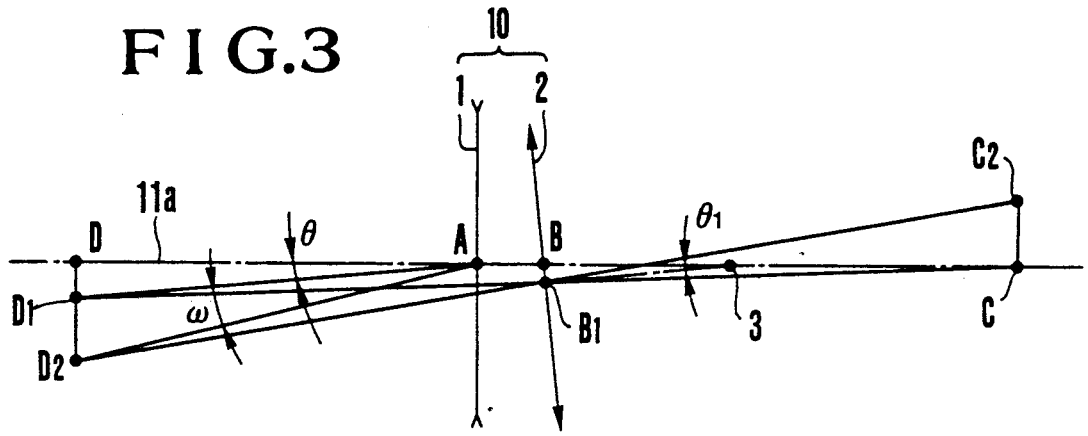

FIG. 3 is a diagram of geometry to explain the image-stabilizing effect of the image-stabilizing optical system 10 when the photographic lens has tilted the angle $\theta 1$ likewise as in FIG. 2. In the same figure, the same reference characters denote the similar significances to those of FIG. 2.

A point C2 shows one point in the marginal zone of the picture frame. An arbitrary point on the image-side focal plane of the first lens group 1 is donated by D2. Putting $\angle D1 \cdot A \cdot D2 = \omega$, we have $\overline{D1, D2} = f1 \cdot \omega$. Letting the point at which the extension of a line fragment connecting the points D2 and B1 intersects the focal plane of the entire system be denoted by C2, from the magnification relationship, $$\overline{C, C2} = \overline{D1, D2} \cdot \beta 2 = f1 \cdot \omega \cdot \beta 2$$

is obtained.

Since the focal length fT of the entirety of the image-stabilizing optical system is given by $fT = f1 \beta 2$, a light beam having an inclination $\omega$ with the optical axis $11a$ in the initial condition reaches a position on the focal plane at a distance $f1 \cdot \beta 2 \cdot \omega$ from the optical axis. This is equal to the aforesaid $\overline{C, C2}$.

By the way, because of $\angle D \cdot A \cdot D1 = -\theta 1$, the object D in axial alignment with the center of the area of the picture frame is imaged at a constant point C regardless of the tilting of the photographic lens (camera body).

By this, an arbitrary point C2 in the marginal zone of the picture frame, too, remains stationary against the tilting of the camera body. Thus, the image stabilizing effect is obtained over the entire area of the picture frame.

In the present embodiment, the distance from the rear principal point of the second lens group to the support point 3 is made shorter than the value of inverted sign of the focal length f1 of the first lens group 1. For this purpose, the system is so constructed as to satisfy the following relationship:

$$-f1 > \beta 2 \cdot f1 / (1 - \beta 2)$$

From this, since $f1 < 0$, we obtain $\beta 2 < 1$. For a range of $0 < \beta 2 < 1$, however, $\beta 2 \cdot f1 / (1 - \beta 2)$ becomes negative. That is, the support point 3 is caused to fall on the object side of the second lens group 2, making it difficult to arrange the operating mechanism for image stabilization.

Also, for $\beta 2$ is nearly equal to 0, $\beta 2 \cdot f1 / (1 - \beta 2)$ is nearly equal to 0 results.

From these reasons, in the present embodiment, the range is set to about $-100 < \beta 2 < -0.3$. This assures that the support point 3 takes the proper position so as to achieve a minimization of the size of the whole system.

The numerical data of a specific example of the present embodiment is shown below where e represents the interval between the principal points of the first lens group and the second lens group, l represents the distance from the image-side principal point of the second lens group to the support point 3 about which the second lens group rotates.

| | |
|---|---|
| f1 = −90 | f2 = 33.33 |
| β2 = −0.5 | e = 10 |
| l = 30 | |

It should be noted that in the present embodiment, determination of the position at which the support point for rotation of the second lens group is to be put is not necessarily made by relying rigorously on the formula: $\beta 2 \cdot f1 / (1 \beta 2)$. Insofar as the stabilization of the image against vibrations is maintained at an acceptable level, a tolerance range of, for example $\pm 10\%$ may be set in. That is, it is rather desirable that the distance l from the rear principal point of the second lens group to the center of rotation (support point) lies in the following range: $(\beta 2 \cdot f1/(1 - \beta 2)) \times 0.9 \leq l \leq (\beta 2 \cdot f1/(1 - \beta 2)) \times 1.1$.

It should also be noted that a damping mechanism may be used for the purpose of preventing bad influences of the auxiliary mechanism for use in holding the second lens group on the support point and of the abutments at the terminal ends of movements of the second lens group.

Though, in connection with the foregoing embodiment, discussion has been conducted with the image magnification of the second lens group assumed to have a certain finite value, the minimization of the size may otherwise be achieved by employing the afocal form in the image-stabilizing optical system 10. For this case, it is recommended that the first lens group and the second lens group are so constructed as to have their focal lengths f1 and f2 respectively in the following condition:

$$-f1 < f2$$

that the first lens group and the second lens group are so arranged that the interval e between their principal points becomes:

$$e = f1 + f2$$

and that the support point about which the second lens group is made rotatable is taken on the optical axis at a point away from its image-side principal point toward the image side by about $(-f1)$. Such an image-stabilizing optical system is disposed in front of the photographic lens and operates in such a manner that when the photographic lens has tilted, the shake of the photographic image is compensated for by the rotation of the second lens group relative to the other.

Figure 4:
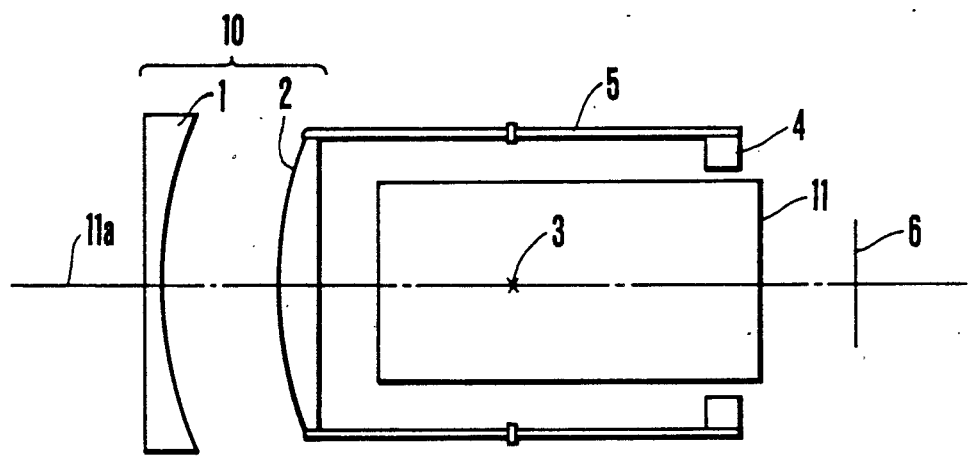
FIG. 4 is a schematic sectional view of the main parts of another embodiment of the image-stabilizing optical device attached to the front of the photographic system.

FIG. 4 is a schematic view of the main parts of another embodiment of the image-stabilizing optical system according to the invention as attached to the front of the photographic lens (fixed focal length lens, zoom lens, etc.) where the parts of the same functions as those shown in FIG. 1 are denoted by the same reference numerals.

The first lens group 1 (focal length f1) and the second lens group 2 (focal length f2) are arranged so as to satisfy the following equation:

$$e = f1 + f2$$

In other words, the first lens group 1 and the second lens group 2 form an afocal system.

The first lens group 1 is held in a lens barrel (not shown), thus being set in fixed axial alignment with the photographic lens (on the camera body), and forms an image of an object (virtual image) on the focal plane of the second lens group 2. So, the second lens group 2 focuses an image at infinity.

In the present embodiment, when the photographic lens 11 (camera body) has, for example, tilted an angle $\theta$, the first lens group 1 tilts together with the photographic lens 11 by the same angle $\theta$, while the second lens group 2 is spatially fixed in alignment with the line of sight by the counter weight 4, in other words, is made to maintain the original attitude. And, with the fulfillment of the aforesaid rules of design for the first lens group 1 and the second lens group 2, the rays are made to deflect through the same angle as the tilting angle of the photographic lens 11 with an advantage that the rotation relationship is simplified. In addition, the support point 3 about which the second lens group 2 rotates is made to lie as front as possible. Thus, the shake of the photographic image is compensated for to stabilize the image, while still maintaining minimization of the size of the whole system to be achieved.

In particular, determination of the focal lengths f1 and f2 of the first lens group 1 and the second lens group 2 is made according to $-f1 < f2$. That is, the first lens group 1 and the second lens group 2 form an afocal system whose angular magnification $\gamma$ is $\gamma < 1$. By this, the position of the support point 3 is put on the object side of the rear focus of the second lens group 2. In such a way, the minimization of the size of the whole system is achieved when the second lens group is used to rotate. From the standpoint of a compromise of the requirements for minimizing the size of the whole system and for well correcting aberrations, it is preferred to set forth a range for the focal length f2 of the second lens group 2 as follows:

$-1.03 f1 < f2 < -2 f1$.

Figure 5:
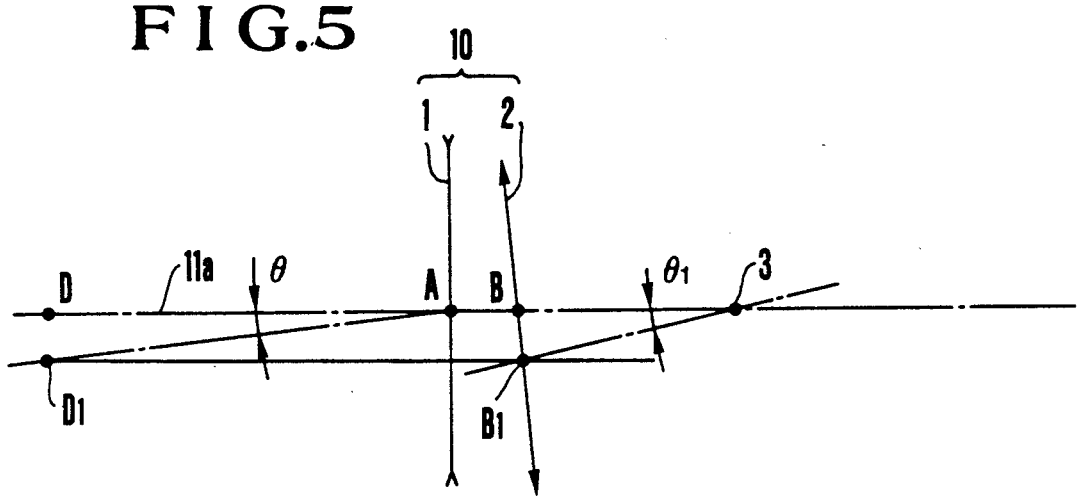
FIG. 5 is a diagram of geometry to explain the image stabilizing effect of the device of the embodiment shown in FIG. 4.

FIG. 5 is a diagram of geometry to explain the image-stabilizing effect of the image-stabilizing optical system 10 of the described character, where the image-stabilizing optical system is shown as the thin lens.

Now, on the assumption that the photographic lens 11 is not tilted, the point at which the first lens group 1 intersects the optical axis 11a is denoted by A, and the point at which the second lens group 2 intersects the optical axis 11a is denoted by B.

When the photographic lens is tilted a minute angle $\theta 1$ upward by vibrations or the like, the first lens group 1 tilts likewise by the same angle $\theta 1$, but the second lens group 2 maintains the initial orientation.

In FIG. 5, for the purpose of simplicity, a converse supposition is made that the photographic lens 11 and the first lens group 1 is in fixed spatial alignment with the line of sight, while the object moves a distance subtending the angle of $-\theta 1$ degrees in the downward direction perpendicular to the line of sight, and the point B, too, moves a distance subtending the angle of $-\theta$ degrees downward along a circle with its center at the support point 3 to a point B1 (where $\overline{B,B1} = -f1 \cdot \theta 1$).

Let us here consider about the imaging state in a point C at the center of the area of the picture frame. In the initial state without accidental displacement, an object lies at a point D on the optical axis 11a. Tracing the ray reversely from the point C, a light beam which enters the second lens group 2 becomes parallel. A light ray passing through the point B1, because of not being subjected to refraction, advances in parallel to the optical axis.

The rear focus of the first lens group 1 and the front focus of the second lens group 2, when no tilting occurs, coincide with each other at the point D on the optical axis 11a, because the first lens group 1 and the second lens group 2 are constructed so as to satisfy the formula: $e = f1 + f2$. When the photographic lens 11 is tilted, on the other hand, the aforesaid light beam focuses itself at a point D1 away from the point D downward by the same distance as $\overline{B,B1}$.

That is, in FIG. 2, $\overline{D,D1} = -f1 \theta 1$.

Under this condition, let us consider about the imaging state of the image point D1 by the first lens group 1. An image forming light lying at the point D1 separate by $f1 \cdot \theta 1$ from the optical axis 11a in the image-side focal plane of the first lens group 1 is made to emerge in parallel from the first lens group 1. AT this time, the inclination $\theta$ is given by the relationship for image formation: $\overline{D,D1} = f1 \cdot \theta$. Therefore, $\theta = -\theta 1$ is obtained.

That is, it is made to emerge in parallel in the same direction as that to the object in the initial state. This means reversely that the object does not move out of the point C at the center of the picture frame even if the photographic system tilts.

Though the foregoing has been described by taking an example of the thin lens system, the same applies to the thick lens system provided the principal point interval is small.

In the description of FIG. 5, the picture frame center is taken as an example when the tilted case of the photographic lens by vibrations is shown. Yet it is apparent that even in any other point than the picture frame center, the stabilized image can be obtained by compensating for the shake of the photographic image in the same manner as that as at the center of the picture frame.

Figure 6:
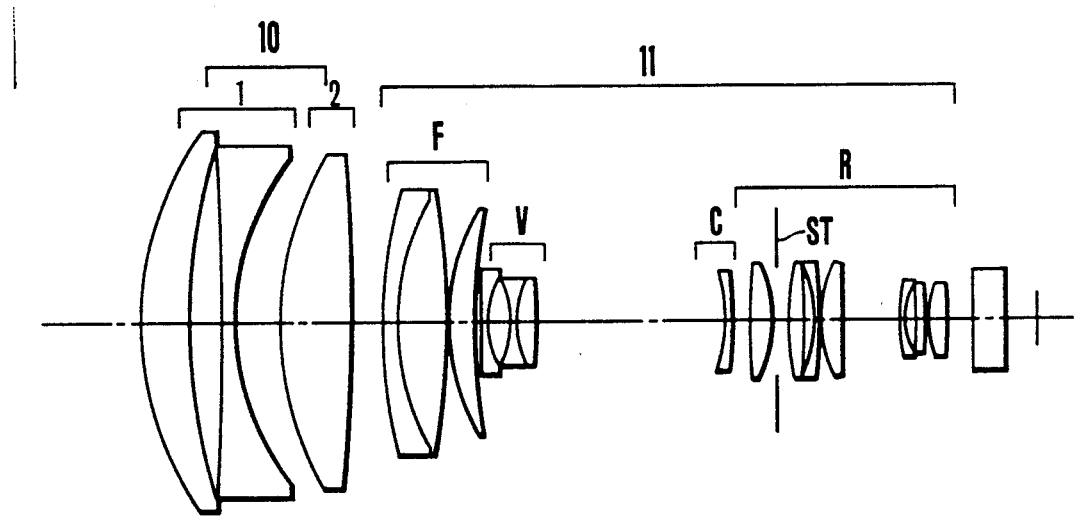
FIGS. 6, 10, 14, 21, 25, 29 and 36 are longitudinal section views of examples of specific image-stabilizing optical systems of the invention.
Figure 7A:
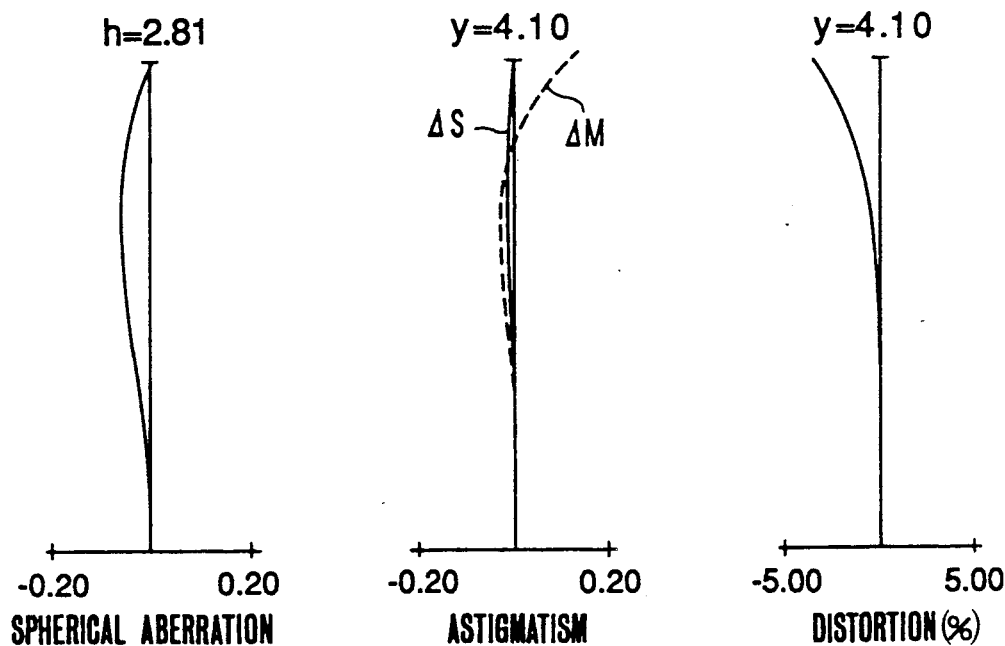
FIGS. 7(A), 7(B), 11(A), 11(B), 15(A), 15(B), 18(A), 18(B), 22(A), 22(B), 26(A), 26(B), 30(A), 30(B), 33(A), 33(B), 37(A) and 37(B) are graphic representations of the various aberrations of the image-stabilizing optical systems in the reference state respectively.
Figure 7B:
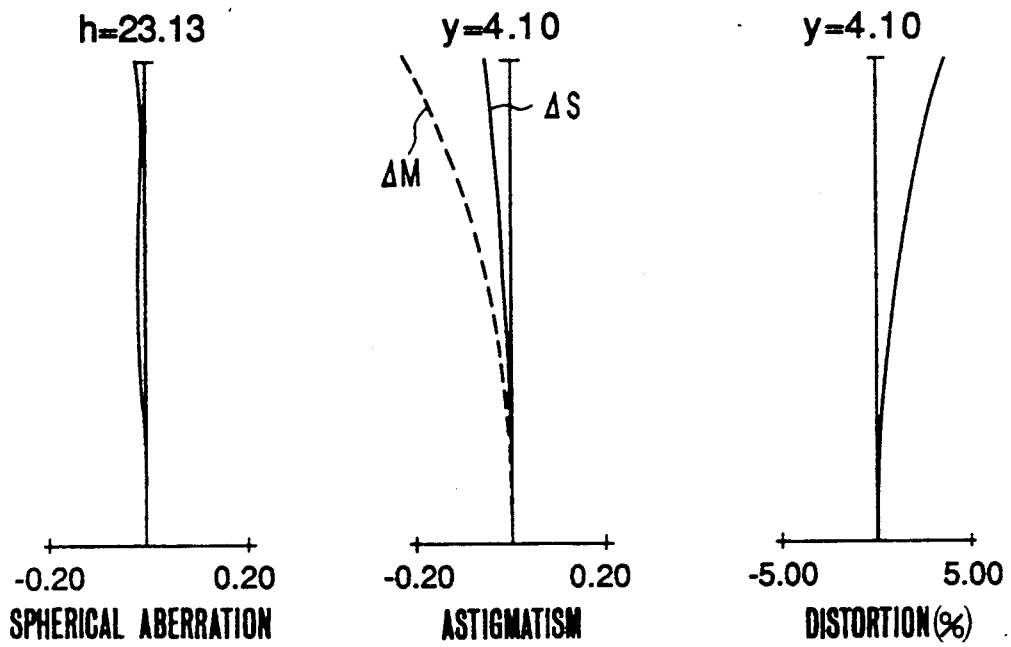
Figure 8A:
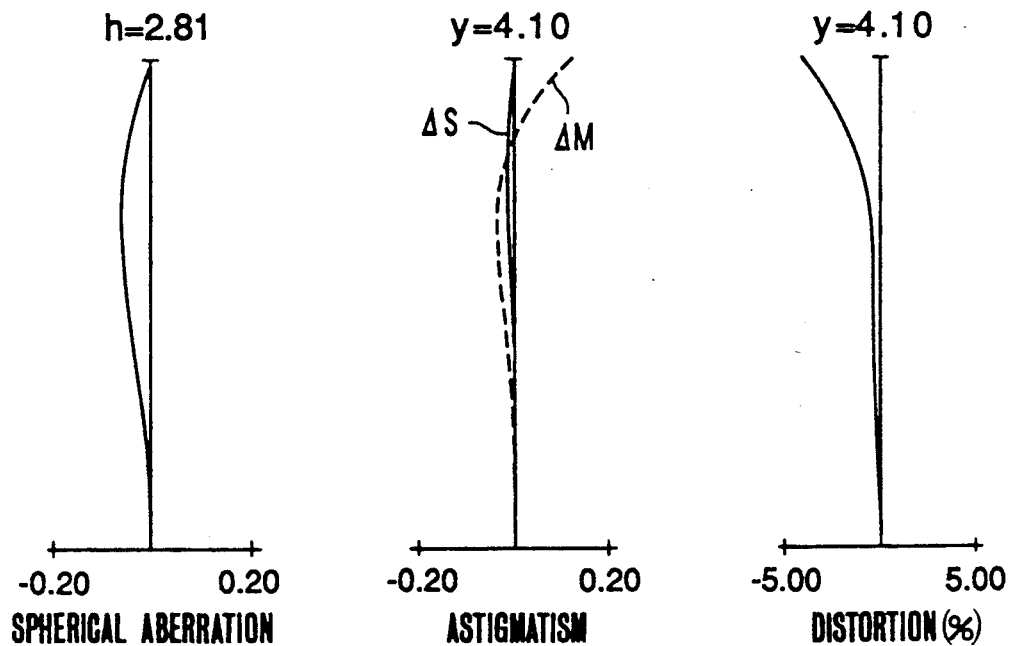
Figure 8B:
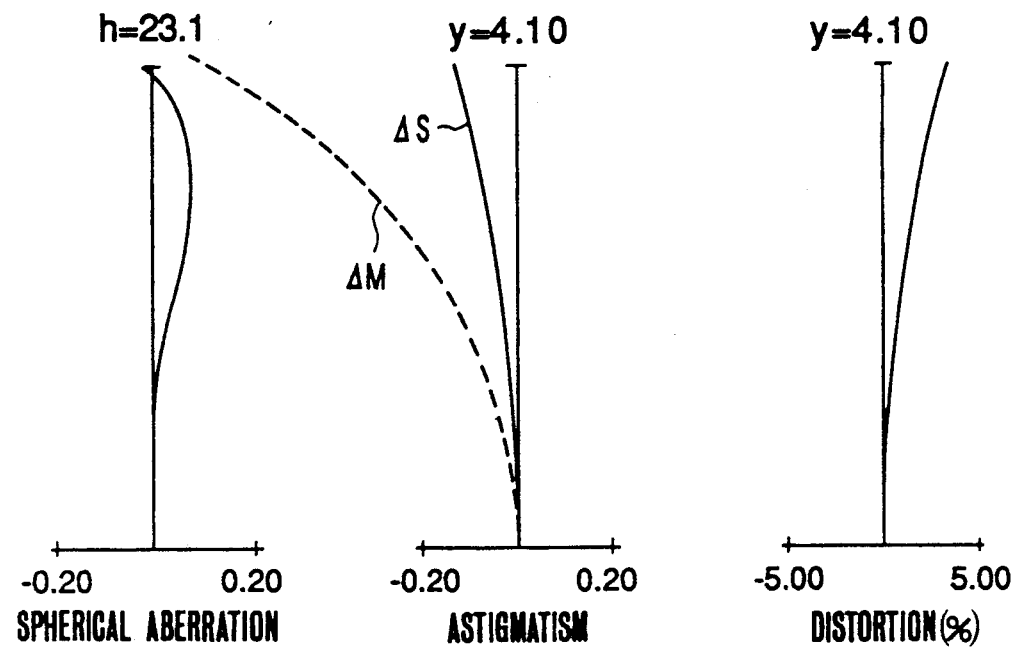
Figure 9A:
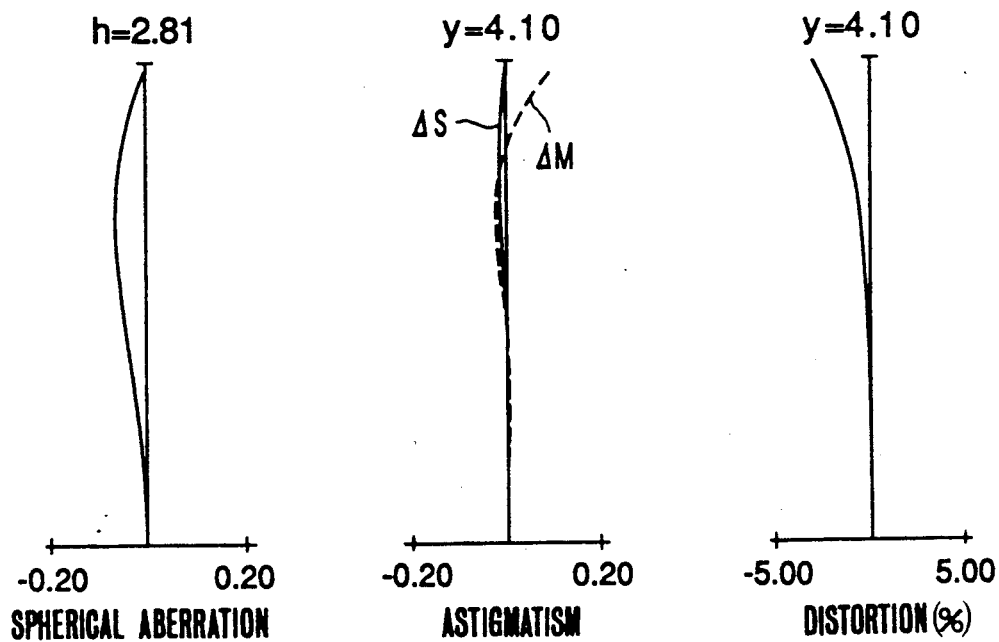
FIGS. 9(A), 9(B), 13(A), 13(B), 17(A), 17(B), 20(A), 20(B), 24(A), 24(B), 28(A), 28(B), 32(A), 32(B), 35(A), 35(B), 39(A) and 39(B) are graphic representations of the various aberrations of the image-stabilizing optical systems respectively with the photographic system tilted $-1°$.
Figure 9B:
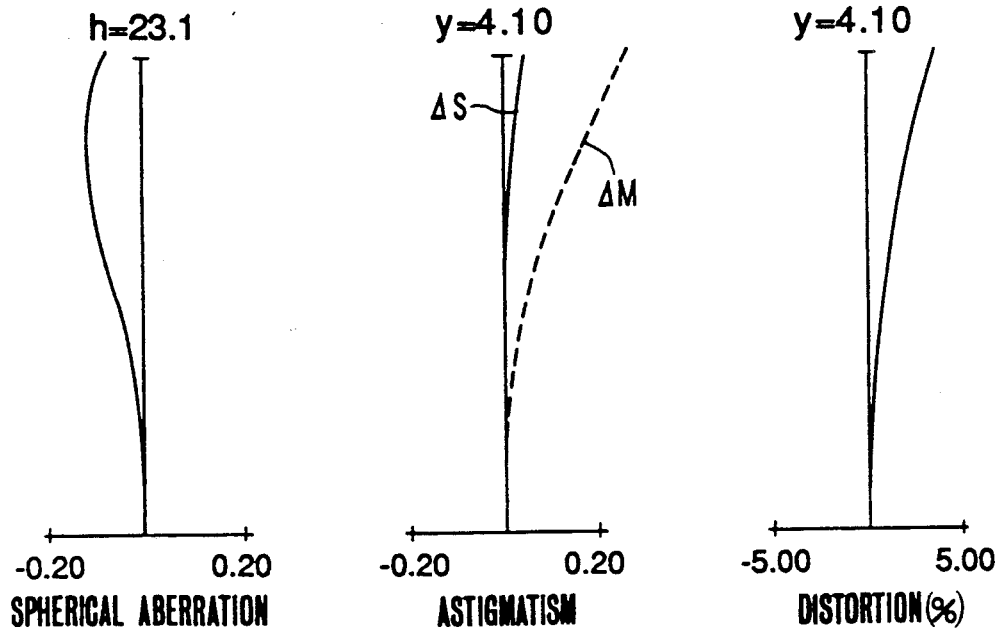

FIG. 6 is a longitudinal section view of a numerical example of the image-stabilizing optical system 10 of the invention attached in front of a zoom lens used as the photographic lens 11.

In the same figure, reference numeral 10 denotes the image-stabilizing optical system having a first lens group 1 of negative refractive power and a rotatable second lens group 2 of positive refractive power. Reference numeral 11 denotes a photographic lens comprising a focusing lens group F, a lens group V for varying the image magnification, a lens group C for compensating for the image shift resulting from the variation of the image magnification and a lens group R for forming an image. Incidentally, ST stands for a stop. A numerical example according to FIG. 6 is shown below.

In the numerical example, Ri represents the radius of curvature of the i-th lens surface when counting from the front, Di the i-th lens thickness or air separation when counting from the front, and Ni and vi respectively the refractive index and Abbe number of the glass of the i-th lens element when counting from the front.

The shape of the aspheric surface is expressed in the coordinates with an X axis in the axial direction and an H axis in the perpendicular direction to the optical axis, the direction in which light advances being taken positive, by the following equation:

$$X = ((1/R)H^2)/(1 + \sqrt{1 - (H/R)^2}) + AH^2 + BH^4 + CH^6 + DH^8 + EH^{10}$$

where R is the radius of the osculating sphere and A, B, C, D and E are the aspheric coefficients.

Incidentally, the photographic lenses for the numerical examples that follow this one all are the same. So, its numerical data is omitted in these examples.

NUMERICAL EXAMPLE 1

Image-Stabilizing Optical System

First Lens Group:
| | | | |
|---|---|---|---|
| R1 = Aspheric | D1 = 8.50 | N1 = 1.49171 | ν1 = 57.4 |
| R2 = 91.96 | D2 = 6.11 | | |
| R3 = −1135.37 | D3 = 3.10 | N2 = 1.69350 | ν2 = 53.2 |
| R4 = 49.16 | D4 = 8.238 | | |

Second Lens Group:
| | | | |
|---|---|---|---|
| R5 = Aspheric | D5 = 14.00 | N3 = 1.49171 | ν3 = 57.4 |
| R6 = −279.13 | | | |

Values of the Factors:

f1 = −90   f2 = 94   e = 4

Values of the Aspheric Coefficients:

| For 1st Surface: | For 5th Surface: |
|---|---|
| R = 63.272 | R = 54.477 |
| B = 6.521 × $10^{-7}$ | B = −6.561 × $10^{-7}$ |
| C = 5.806 × $10^{-10}$ | C = −4.347 × $10^{-10}$ |
| D = −1.878 × $10^{-13}$ | D = 2.773 × $10^{-13}$ |

(Photographic Lens)

F = 8.28 − 76.29   FNo = 1 : 1.4 − 1.7

| | | | |
|---|---|---|---|
| R1 = 104.07 | D1 = 2.60 | N1 = 1.80518 | ν1 = 25.4 |
| R2 = 45.63 | D2 = 9.30 | N2 = 1.60311 | ν2 = 60.7 |
| R3 = −163.62 | D3 = 0.15 | | |
| R4 = 40.88 | D4 = 5.00 | N3 = 1.62299 | ν3 = 58.1 |
| R5 = 121.42 | D5 = Variable | | |
| R6 = 163.97 | D6 = 1.20 | N4 = 1.83400 | ν4 = 37.2 |
| R7 = 14.67 | D7 = 4.54 | | |
| R8 = −18.14 | D8 = 1.00 | N5 = 1.71299 | ν5 = 53.8 |
| R9 = 17.54 | D9 = 3.50 | N6 = 1.84666 | ν6 = 23.9 |
| R10 = −93.94 | D10 = Variable | | |
| R11 = −24.06 | D11 = 1.00 | N7 = 1.69680 | ν7 = 55.5 |
| R12 = −134.02 | D12 = Variable | | |
| R13 = 105.88 | D13 = 3.90 | N8 = 1.71299 | ν8 = 53.8 |
| R14 = −27.07 | D14 = 1.30 | | |
| R15 = Stop | D15 = 2.00 | | |
| R16 = 38.07 | D16 = 3.20 | N9 = 1.62299 | ν9 = 58.1 |
| R17 = −156.99 | D17 = 1.85 | | |
| R18 = −24.96 | D18 = 1.20 | N10 = 1.84666 | ν10 = 23.9 |
| R19 = −74.34 | D19 = 0.15 | | |
| R20 = 22.98 | D20 = 4.00 | N11 = 1.62299 | ν11 = 58.1 |
| R21 = 944.98 | D21 = 10.98 | | |
| R22 = 23.30 | D22 = 1.00 | N12 = 1.80518 | ν12 = 25.4 |
| R23 = 11.75 | D23 = 1.88 | | |
| R24 = 871.81 | D24 = 2.50 | N13 = 1.51633 | ν13 = 64.1 |
| R25 = −46.29 | D25 = 0.15 | | |
| R26 = 15.91 | D26 = 3.60 | N14 = 1.62299 | ν14 = 58.1 |
| R27 = ∞ | D27 = 5.00 | | |
| R28 = ∞ | D28 = 6.00 | N15 = 1.51633 | ν15 = 64.1 |
| R29 = ∞ | | | |

Lens Separations During Zooming

| Focal Length | D5 | D10 | D12 |
|---|---|---|---|
| 8.28 | 1.19 | 35.46 | 3.44 |
| 76.29 | 35.54 | 3.65 | 1.89 |

It should be noted that in the present embodiment, the distance of the support point about which the second lens group rotates from the image side principal point of the second lens group is not necessarily equalized rigorously to (−f1), but may be made to lie in an acceptable tolerance range of, for example, ±10%, provided so much a standstill image as to be allowable by vibrations is obtained.

Also, in the present embodiment, a damping mechanism may be provided for preventing bad influences due to the use of auxiliary means in the mechanism for holding the second lens group on the support point and due to the abutments at the terminal ends of movement of the second lens group.

In the present invention, by exactly the same mode of consideration as that describe above, instead of the second lens group, the first lens group is freely supported at a point away from the second lens group by a distance equal to the focal length f1, that is, the support point about which the first lens group rotates lies in front of the second lens group, so that the image stabilizing effect is produced.

According to the present invention, by disposing an optical system having a first lens group and a second lens group of such optical properties as described before in front of the photographic system, it is made possible to achieve realization of an image-stabilizing optical system which has a simple rotation relationship and brings the support point for rotation of the second lens group to a position close to the second lens group so that the size of the whole system is minimized.

Also by providing a counter weight to the second lens group, an image-stabilizing optical system can be achieved, which does not necessitate vibration detecting means such as an acceleration sensor in compensating for the shake of the photographic image, thus making it possible to obtain the stabilized image with ease.

Also, according to the invention, if, for example, the length from the photographic lens to the image plane is made constant, limitations arise on the layout of the support point 3 and the counter weight. For this case, in the conventional example shown in U.S. Pat. No. 2,959,088, there is the limitation that the support point must be put on the focus position of the second lens group 2. Hence, a condition of large limitation on the focal length f2 of the second lens group 2 is introduced. In the present invention, however, because the focal length f1 of the first lens group 1 can be freely chosen, it is relatively easy to increase the focal length f2 of the second lens group 2. This becomes advantageous in correcting aberrations. Conversely when the focal length f2 is made the same, the approach of the support point 3 to the object side makes it possible to advance the compactness of the whole system and also to reduce the counter balance weight. Hence, the invention produces a great advantage to minimize the size and weight of the system.

Also, in the present invention, f1 ≠ −f2 is usable. So, there is no need to make e=0. This means that there is no limitation on the positions of the principal points of the first lens group 1 and the second lens group 2. Hence, the invention has a characteristic feature that produces an advantage of remarkably improving aberration correction.

Next, while basing on the principle described above, specific embodiments of the invention which have sufficiently taken into account the optical performance are explained below. At first, an aspheric surface is applied to at least one lens surface in the second lens group so that as the second lens group is decentered by rotating with vibrations, variation of the decentering aberrations is lessened to prevent the optical performance from lowering.

In particular, this aspheric surface is formed to such a shape that the positive refractive power becomes progressively weaker from the center of the area of the lens to the margin (when applying it to the surface of positive refractive power, the shape is defined in such a manner that the curvature becomes progressively weaker toward the margin, or when to the surface of negative refractive power, vice versa). With the use of, for example, a zoom lens as the photographic lens, the distortion in the wide-angle end and the spherical aberration and coma in the telephoto end are corrected well.

Further, in the present embodiment, as the shape of the aspheric surface is defined in terms of the amount of deviation $\Delta R2$ from the osculating sphere at 0.7 of the effective radius of the aspheric surface from the center of the lens, a range for $\Delta R2$ is set forth as follows:

$$3 \times 10^{-4} < |\Delta R2/f2| < 2.2 \times 10^{-3}$$

By this, the advantage arising from the application of the aspheric surface is brought into full play. Thus, the variation of the decentering aberrations with rotation of the second lens group for image stabilization is corrected well.

Figure 10:
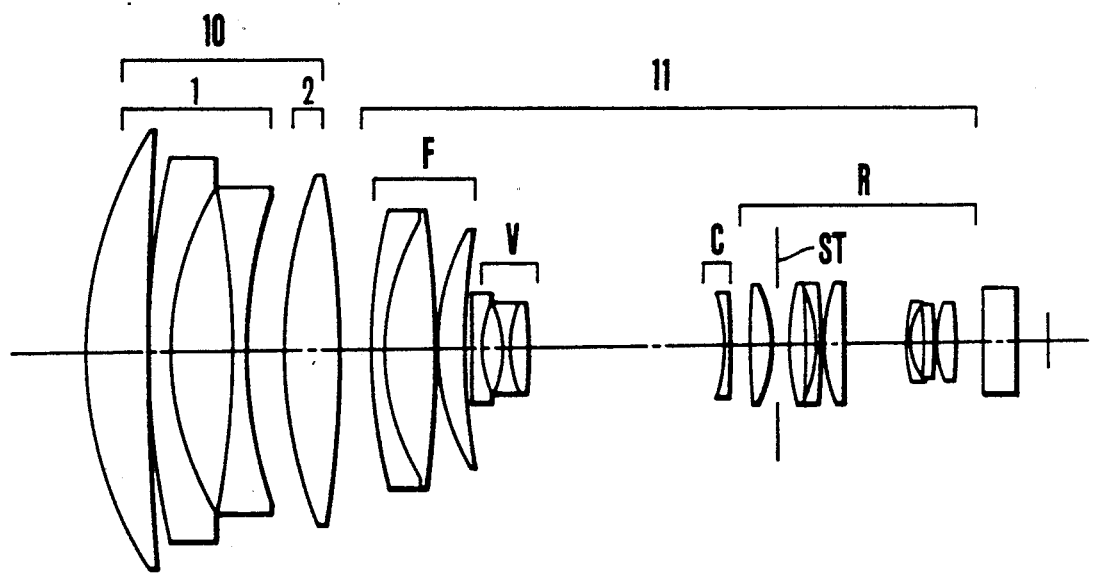
Figure 11A:
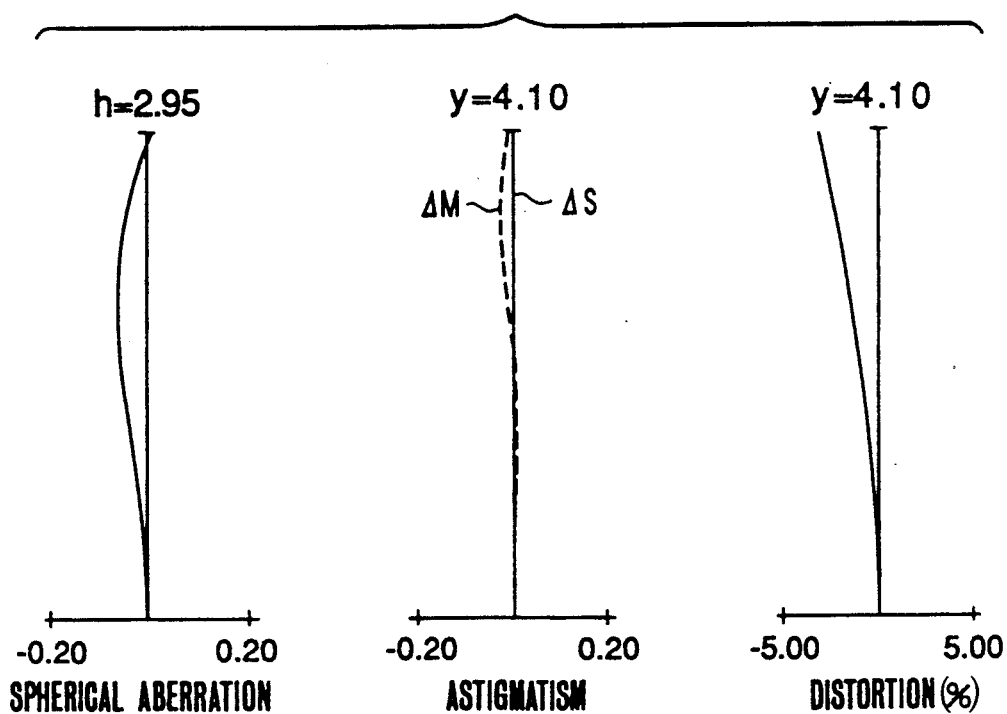
Figure 11B:
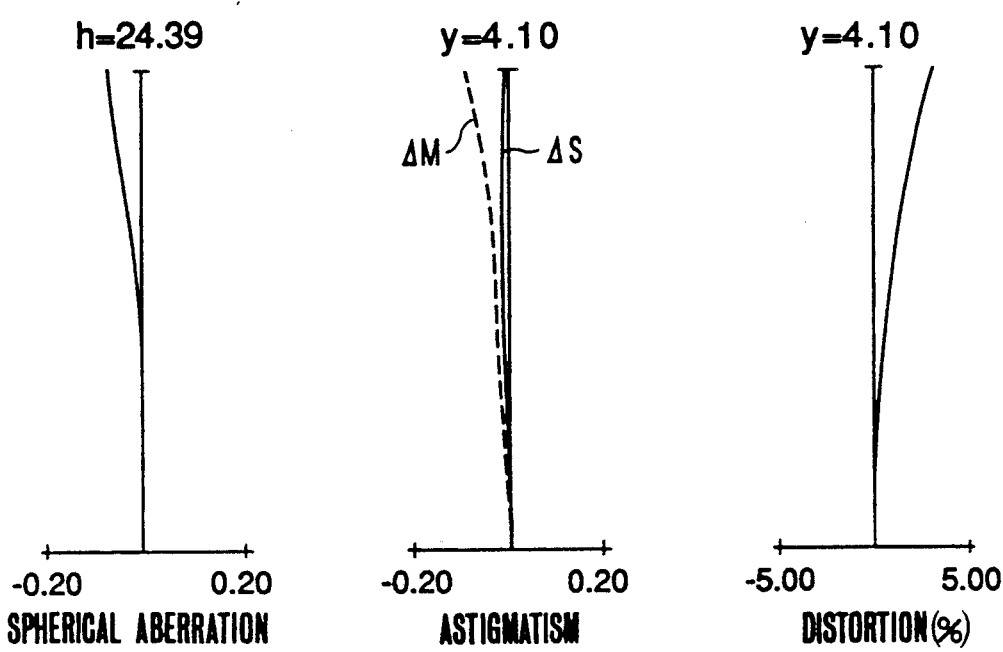
Figure 13A:
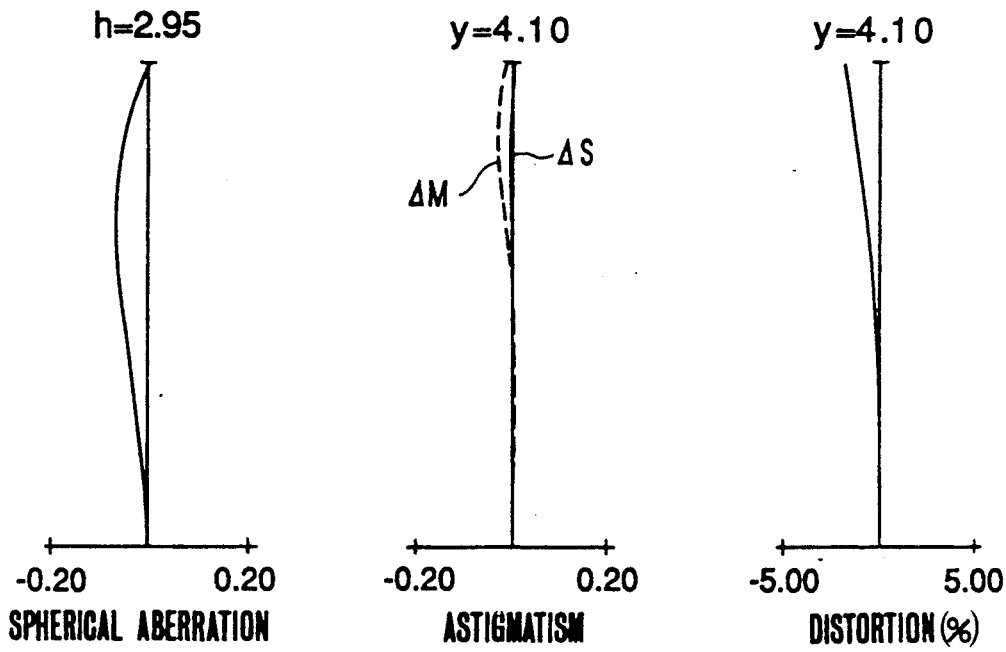
Figure 13B:
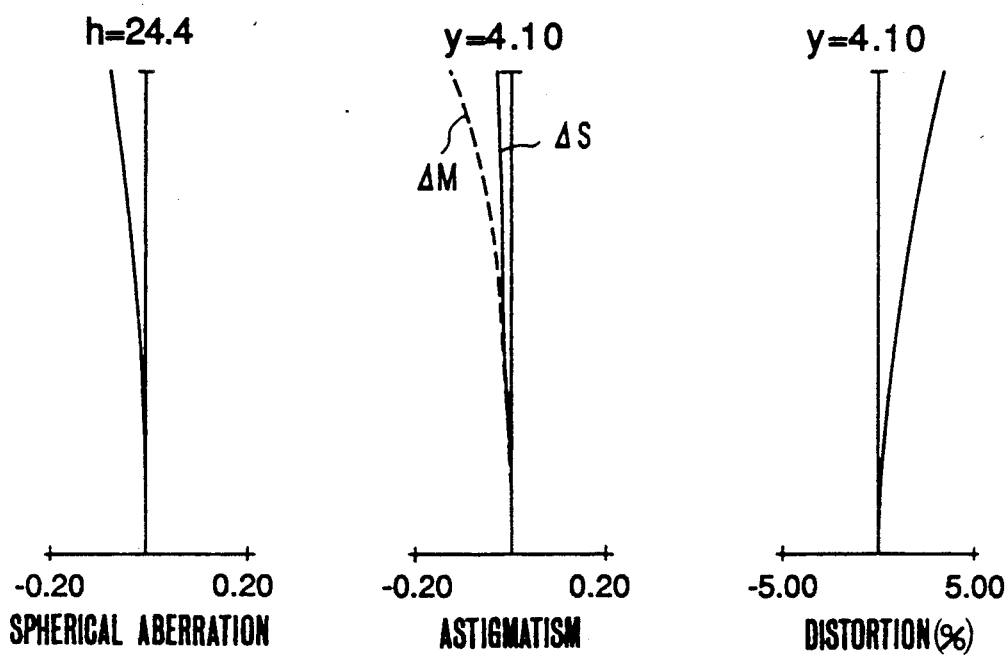

FIG. 10 is a longitudinal section view of another numerical example of the image-stabilizing optical system 10 of the invention attached to a zoom lens used as the photographic lens 11.

And, the numerical data of the lens of FIG. 10 is shown below.

NUMERICAL EXAMPLE 2

Image-Stabilizing Optical System)

| R1 = 71.09 | D1 = 11.00 | N1 = 1.71299 | ν1 = 53.8 |
|---|---|---|---|
| R2 = 615.56 | D2 = 0.20 | | |
| R3 = 165.19 | D3 = 3.20 | N2 = 1.66672 | ν2 = 48.3 |
| R4 = 53.34 | D3 = 11.45 | | |
| R5 = −128.58 | D5 = 2.80 | N3 = 1.69680 | ν3 = 55.5 |
| R6 = 82.33 | D6 = 6.71 | | |
| R7 = Aspheric | D7 = 10.30 | N4 = 1.60311 | ν4 = 60.7 |
| R8 = −150.80 | | | |

Factors:
f1 = −90    f2 = 90    e = 0
Aspheric Coefficients:
For 7th Surface
R = 82.62
B = −1.845 × 10$^{-7}$
C = 5.776 × 10$^{-11}$
D = −6.777 × 10$^{-14}$ It is to be noted that in the following embodiments, the value of $\beta2$ of the aforesaid inequalities of condition f1·$\beta2$/(1−$\beta2$) is treated as substantial infinity, and the first lens group 1 and the second lens group 2 are arranged so that their principal point interval e satisfies the following condition:

$$e = f1 + f2$$

In this case, therefore, the center of rotation of the second lens group, i.e., the support point 3, takes its place on the optical axis 11a at a distance (−f1) from the image-side principal point of the second lens group 2 and even within the photographic lens.

In particular, for the focal lengths f1 and f2 of the first lens group and the second lens group, −f1≦f2 is set forth. In other words, the first lens group and the second lens group are made to form an afocal system whose angular magnification γ becomes γ≦1. This allows the support point 3 to take its position on the object side of the rear focus of the second lens group with an advantage that when the second lens group is used to rotate, a minimization of the size of the whole system is achieved.

Figure 14:
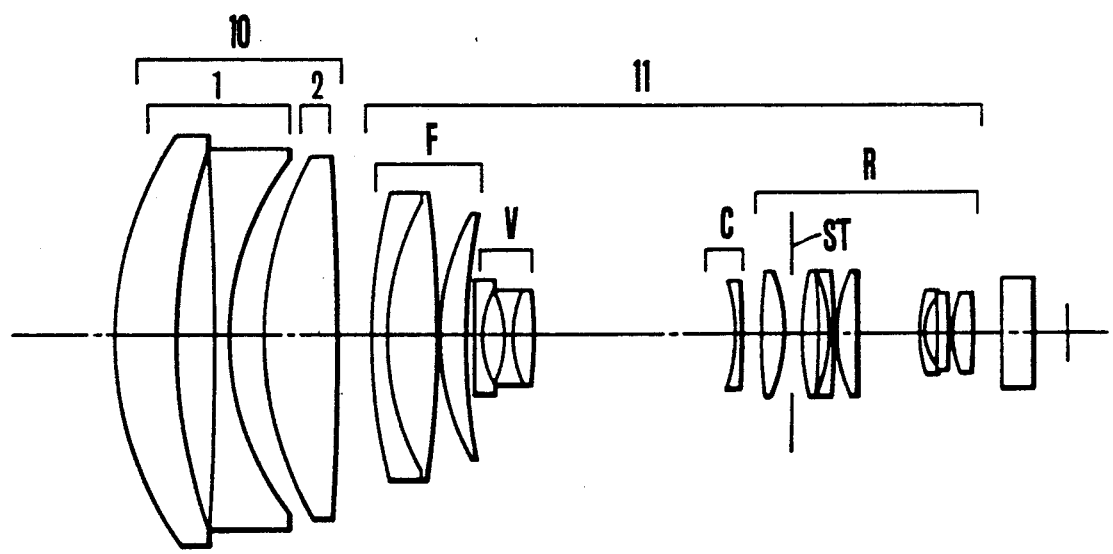
Figure 15A:
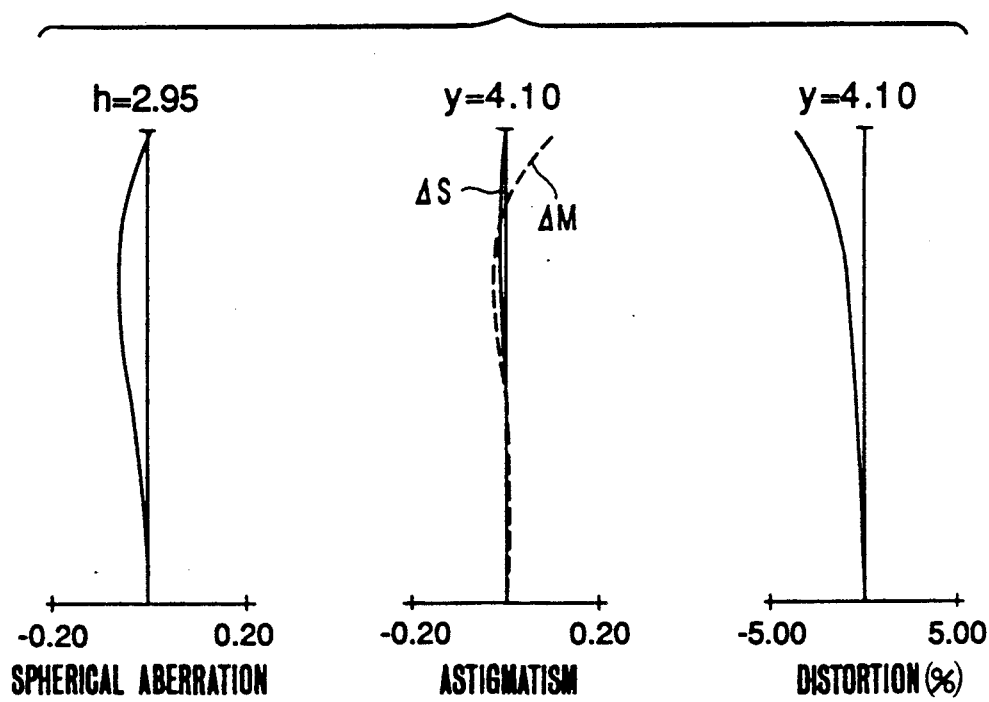
Figure 15B:
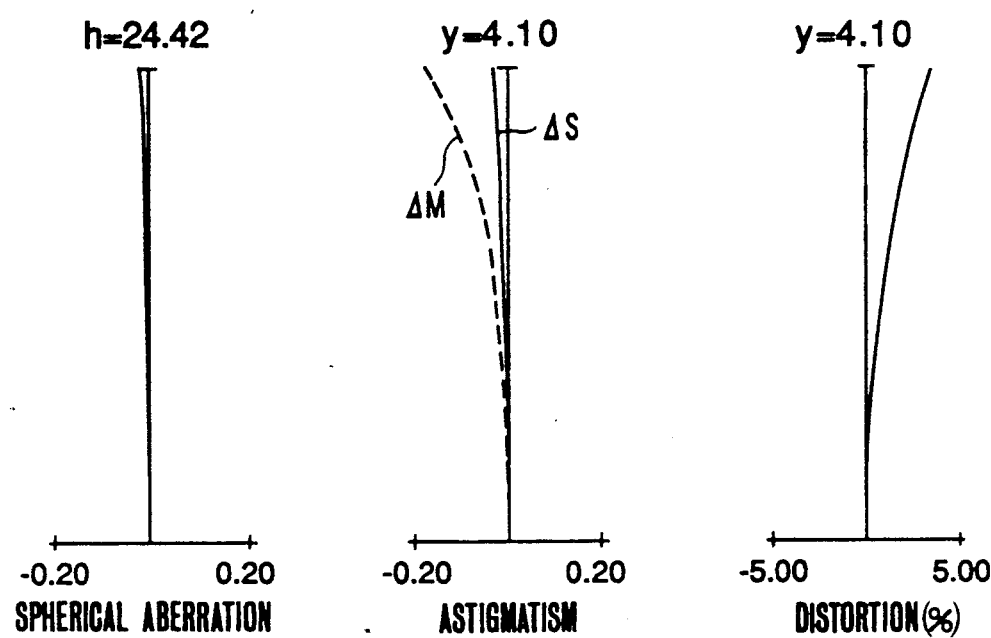
Figure 16A:
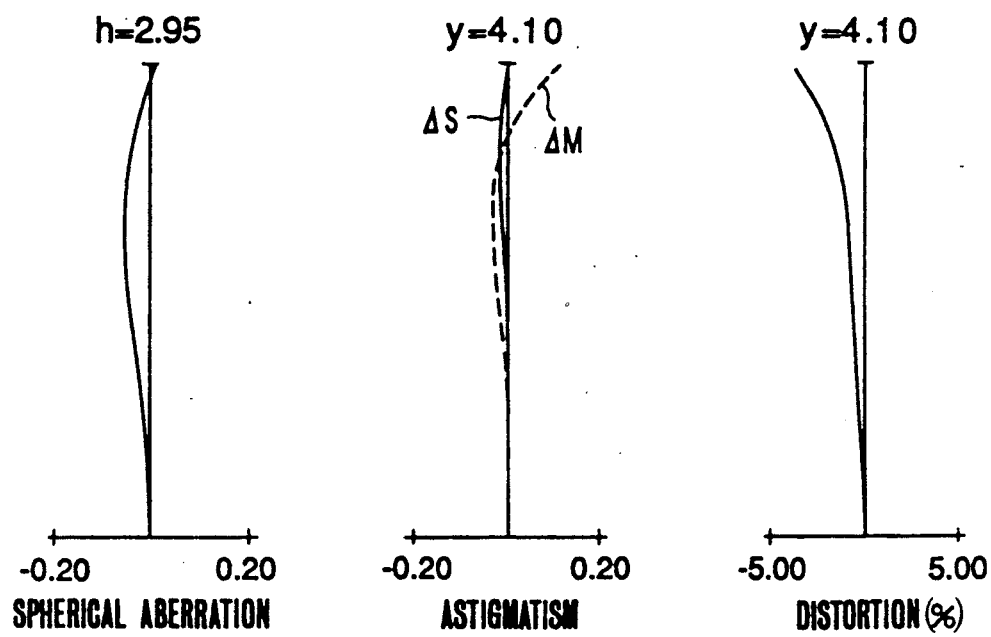
Figure 16B:
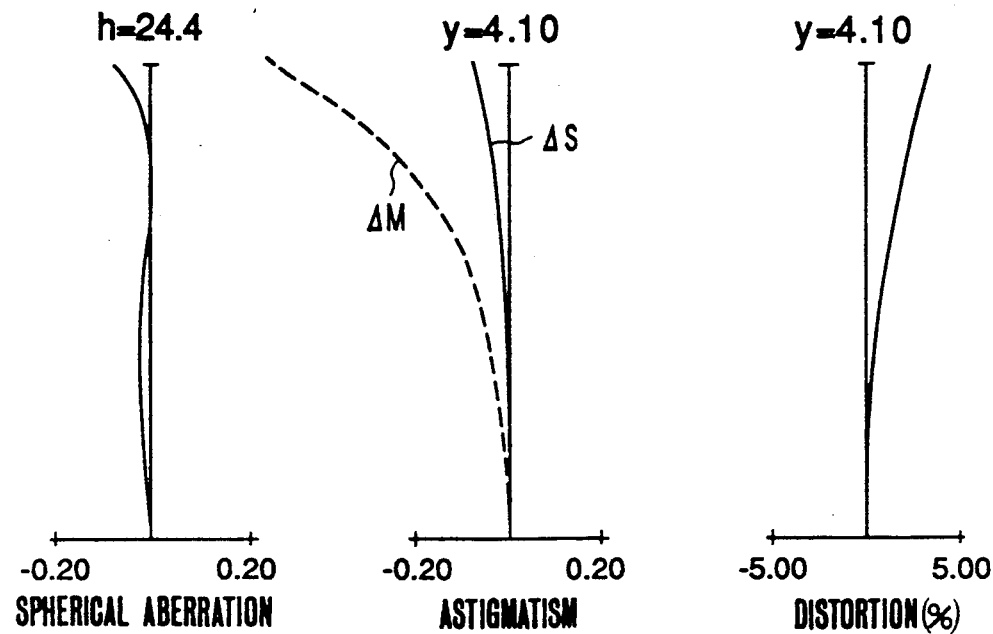
Figure 17A:
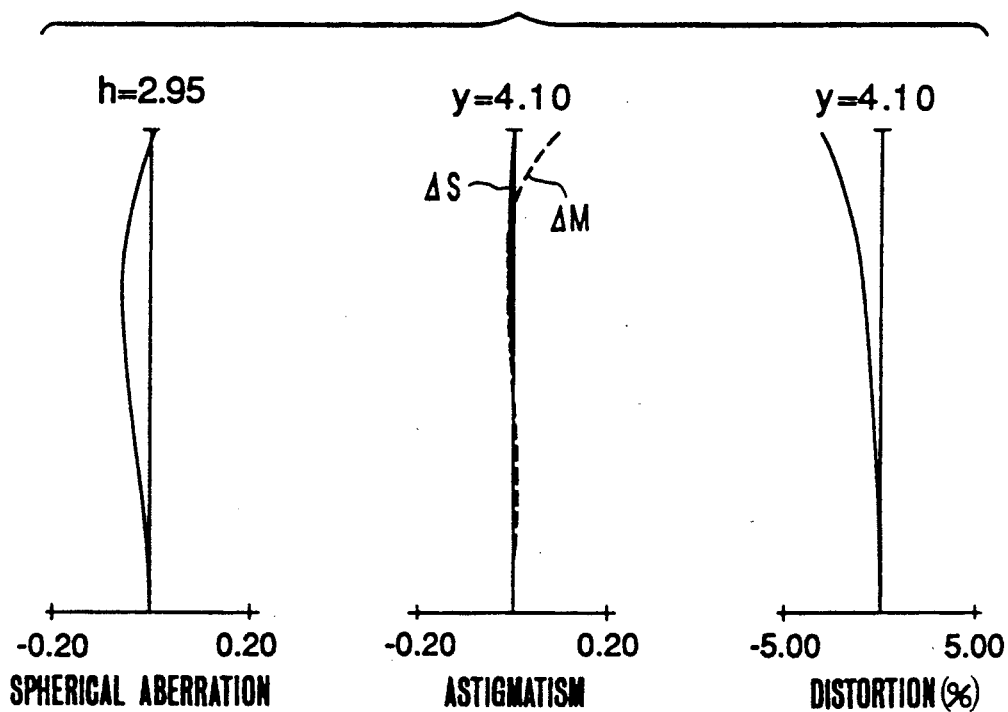
Figure 17B:
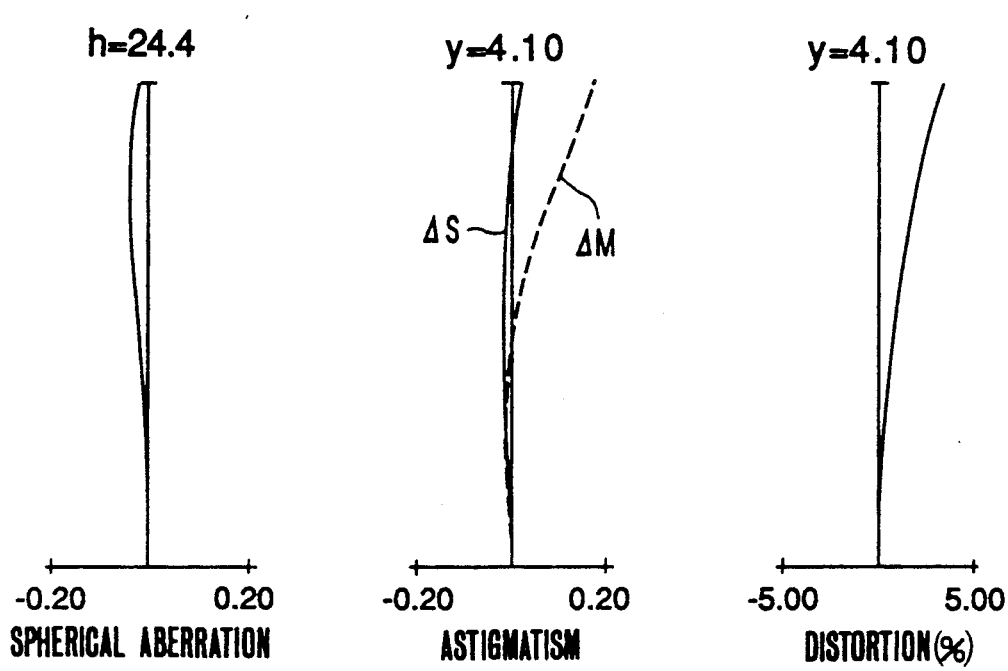
Figure 18A:
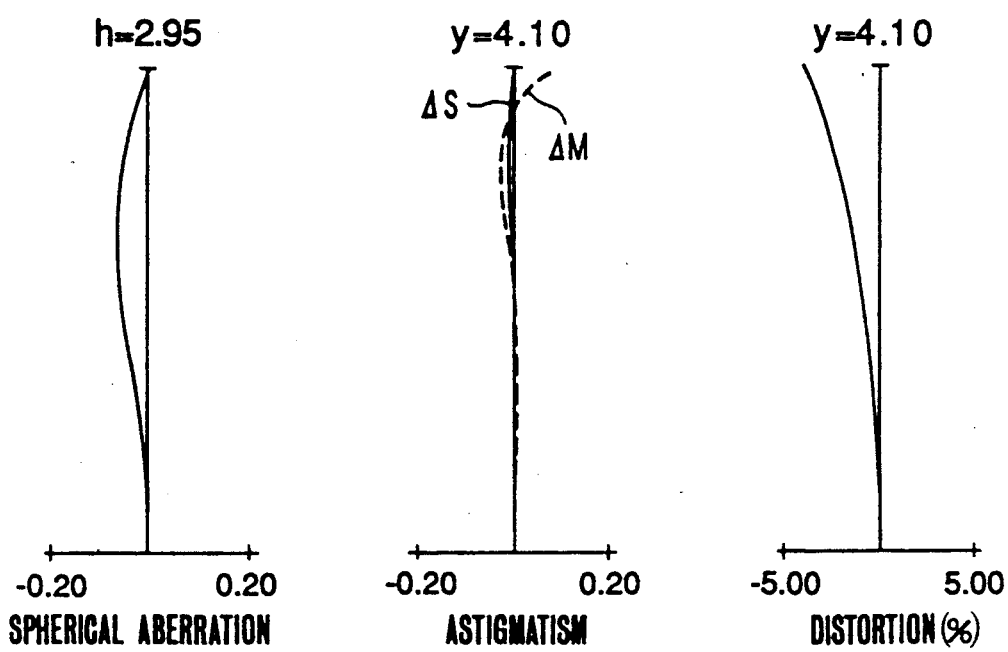
Figure 18B:
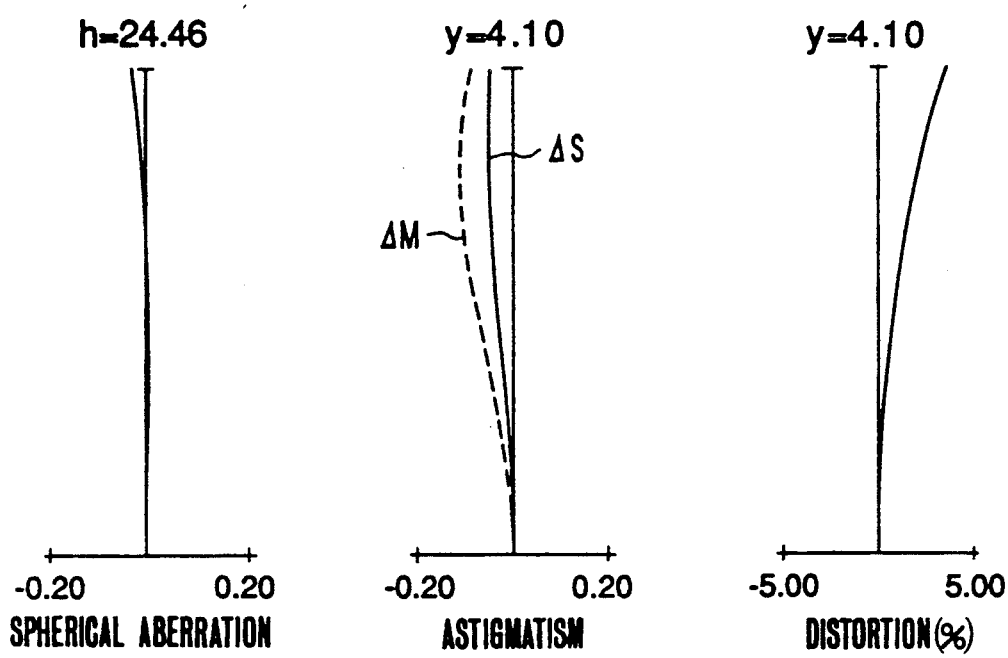
Figure 19A:
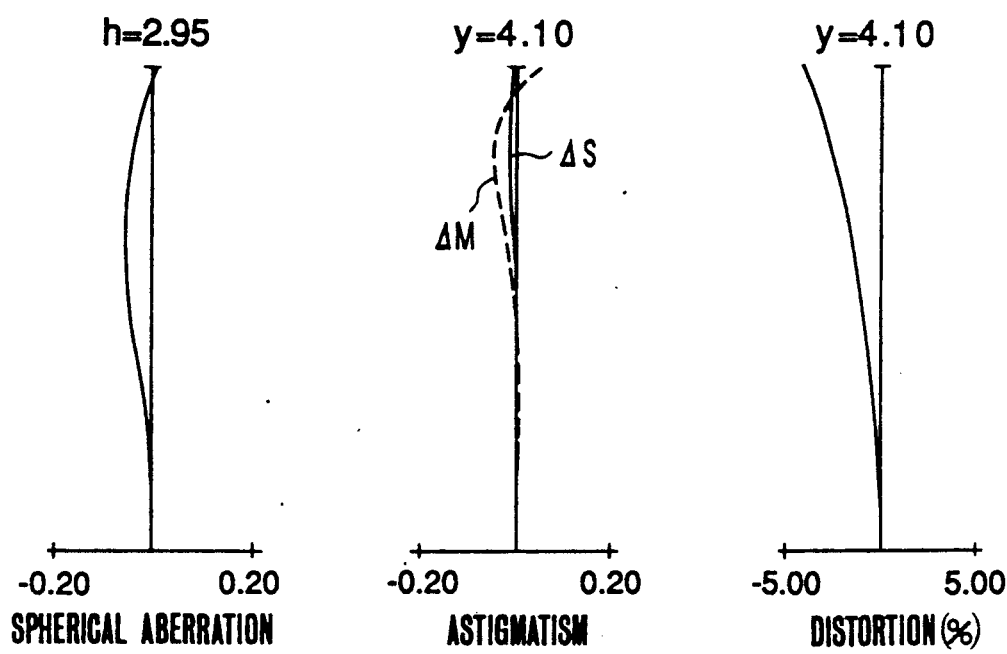
Figure 19B:
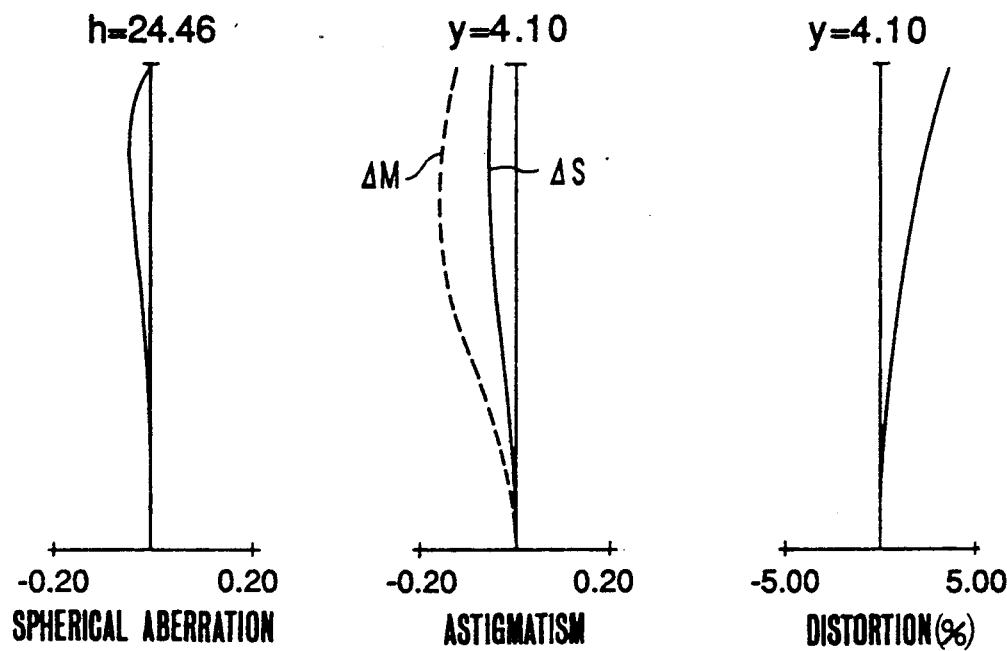
Figure 20A:
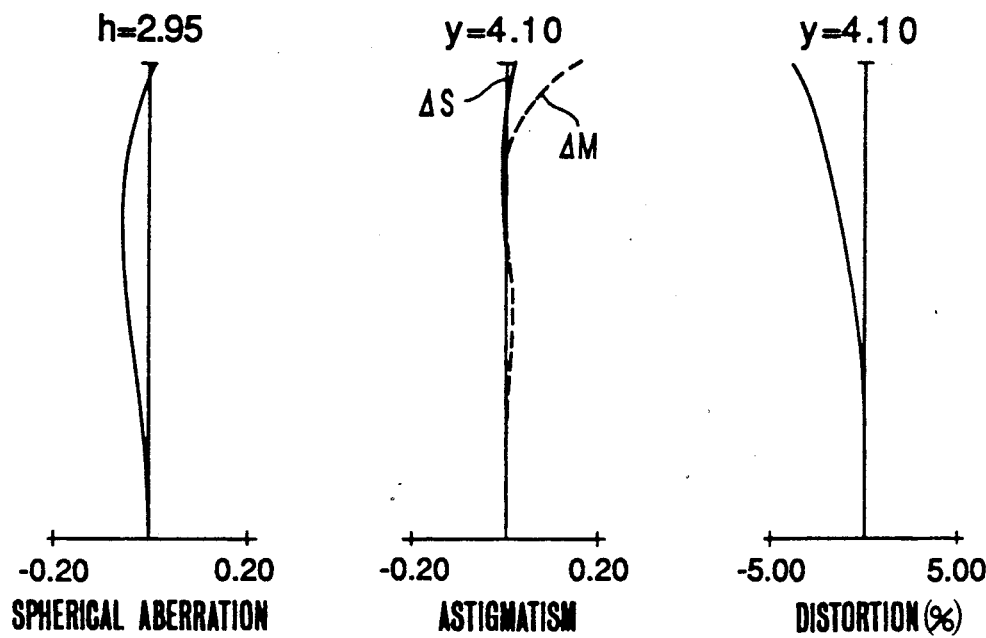
Figure 20B:
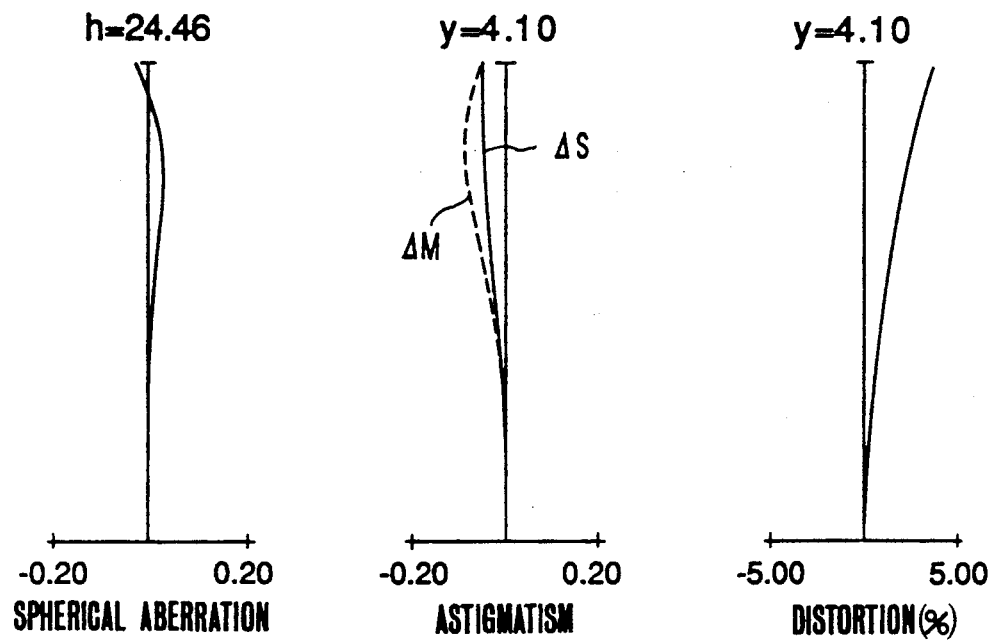

Next, FIG. 14 shows another specific embodiment in which an aspheric surface is applied to at least one surface of each of the first lens group and the second lens group, so that as the image-stabilizing optical system is attached in front of the photographic system, the range of variation of the image aberrations is minimized to preserve the high optical performance.

In this connection, it is particularly recommended that the aspheric surface to be used in the first lens group of negative refractive power is formed to such a shape that the positive refractive power becomes progressively stronger from the center of the lens surface to the margin. When applying it to, for example, the positive refracting surface (convex surface), the curvature becomes progressively stronger (the radius of curvature becomes progressively smaller) toward the margin of the lens. When applying it to the negative refracting surface (concave surface), the curvature (the radius of curvature) becomes progressively weaker (larger) toward the margin.

It is also recommended that the aspheric surface to be used in the second lens group of positive refractive power is formed to such a shape that the positive refractive power becomes progressively weaker from the center of the lens to the margin. When applying it to, for example, the positive refracting surface, the curvature (the radius of curvature) becomes progressively weaker (larger) toward the margin. When applying it to the negative refracting surface, the curvature (the radius of curvature) becomes progressively stronger (smaller) toward the margin.

Thus, in the present embodiment, by specifying the shape of the aspheric surfaces, despite the use of the image-stabilizing optical system attached in front of the photographic system, the optical performance of the whole combined lens system is kept excellent. Another advantage is that the decentering aberrations produced by rotating the second lens group to decenter are reduced to prevent the optical performance from lowering.

As, for example, a zoom lens is used as the photographic lens, the distortion in the wide-angle end and the spherical aberration and coma in the telephoto end are corrected well.

Further, in the present embodiment, rules of figuring the aspheric surfaces in the first lens group and the second lens group in terms of the amounts of deviation, $\Delta R1$ and $\Delta R2$, of the aspheric surface from the osculating sphere at 0.7 of its effective radius from the center of the lens respectively are set forth as follows:

$$1.9 \times 10^{-4} < |\Delta R1/f1| < 3.5 \times 10^{-3}$$

$$3 \times 10^{-4} < |\Delta R2/f2| < 2.2 \times 10^{-3}$$

When these conditions are satisfied, the advantage arising from the use of the aspheric surfaces is brought into full play. Hence, this permits the image-stabilizing optical system, when used in combination with the photographic lens, to retain the good optical performance and, moreover, to keep the decentering aberration correction stable over the range of rotation of the second lens group for image stabilization.

Numerical examples of the image-stabilizing optical system according to the invention are shown below.

NUMERICAL EXAMPLE 3

Image-Stabilizing Optical System

| | | | |
|---|---|---|---|
| R1 = Aspheric | D1 = 10.80 | N1 = 1.49171 | $\nu1 = 57.4$ |
| R2 = 93.30 | D2 = 6.35 | | |
| R3 = −651.22 | D3 = 3.10 | N2 = 1.69350 | $\nu2 = 53.2$ |
| R4 = 49.16 | D4 = 5.63 | | |
| R5 = Aspheric | D5 = 14.00 | N3 = 1.49171 | $\nu3 = 57.4$ |
| R6 = −289.79 | | | |

Factors:
f1 = −90   f2 = 90   e = 0

Aspheric Coefficients:

| For 1st Surface | For 5th Surface |
|---|---|
| R = 62.68 | R = 51.40 |
| B = 5.12 × $10^{-7}$ | B = −7.06 × $10^{-7}$ |
| C = 5.34 × $10^{-10}$ | C = −5.07 × $10^{-10}$ |
| D = −1.01 × $10^{-13}$ | D = 2.40 × $10^{-13}$ |

NUMERICAL EXAMPLE 4

Image-Stabilizing Optical System

| | | | |
|---|---|---|---|
| R1 = Aspheric | D1 = 10.80 | N1 = 1.49171 | $\nu1 = 57.4$ |
| R2 = 123.06 | D2 = 6.31 | | |
| R3 = −246.52 | D3 = 3.10 | N2 = 1.69350 | $\nu2 = 53.2$ |
| R4 = 53.25 | D4 = 4.82 | | |
| R5 = 55.54 | D5 = 14.00 | N3 = 1.49171 | $\nu3 = 57.4$ |
| R6 = Aspheric | | | |

Factors:
f1 = −90   f2 = 90   e = 0

Aspheric Coefficients:

| For 1st Surface | For 6th Surface |
|---|---|
| R = 67.36 | R = −199.68 |
| B = 6.61 × $10^{-7}$ | B = 7.2 = $10^{-7}$ |
| C = −5.74 × $10^{-11}$ | C = −8.06 × $10^{-11}$ |
| D = 3.73 × $10^{-13}$ | D = 3.65 × $10^{-13}$ |

Figure 21:
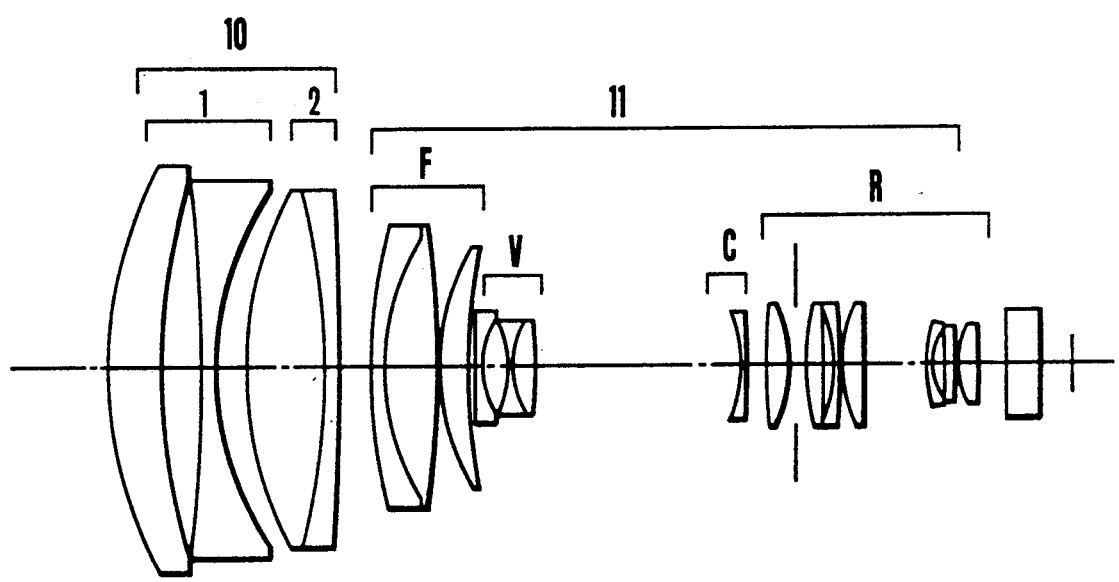
Figure 22A:
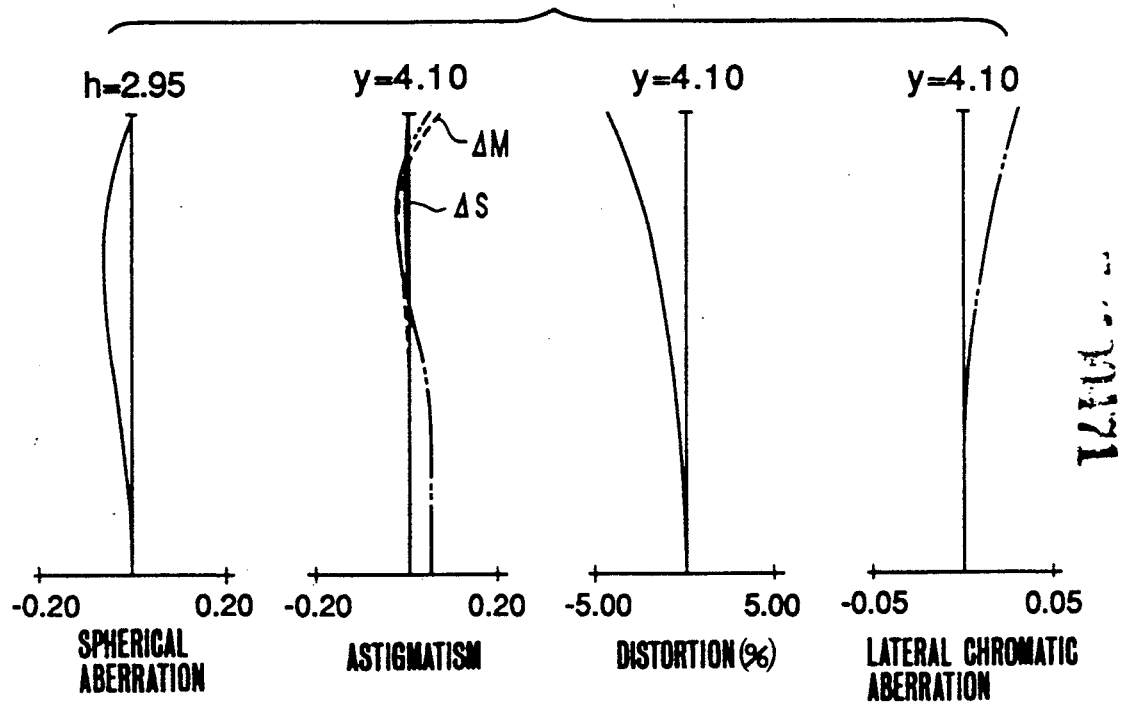
Figure 22B:
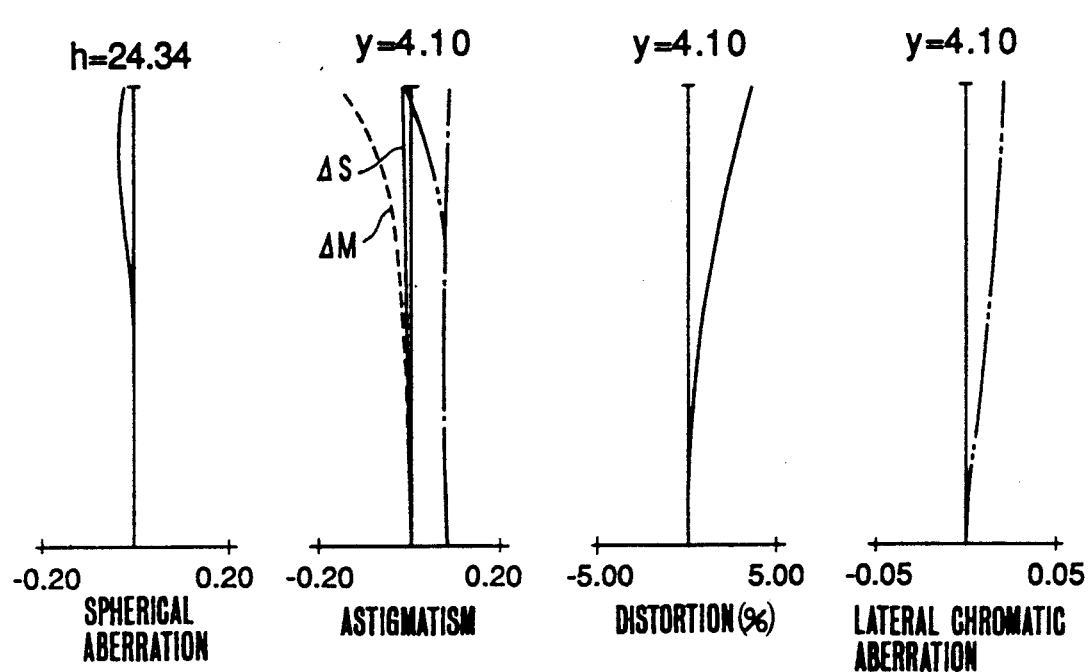
Figure 23A:
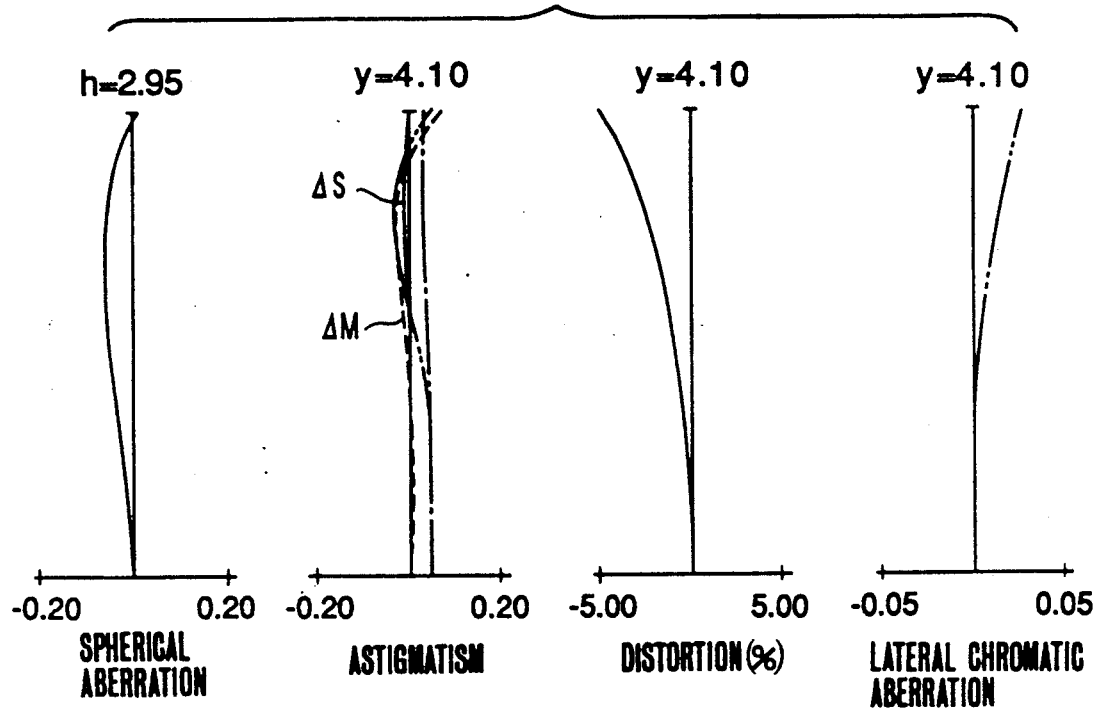
Figure 23B:
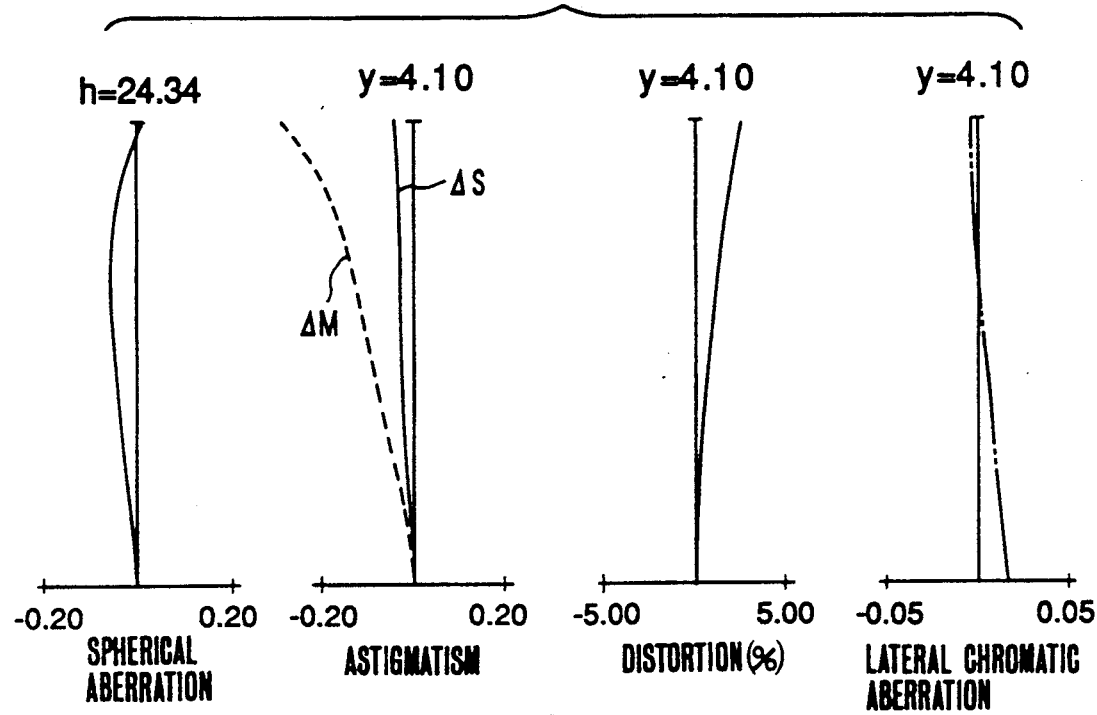
Figure 24A:
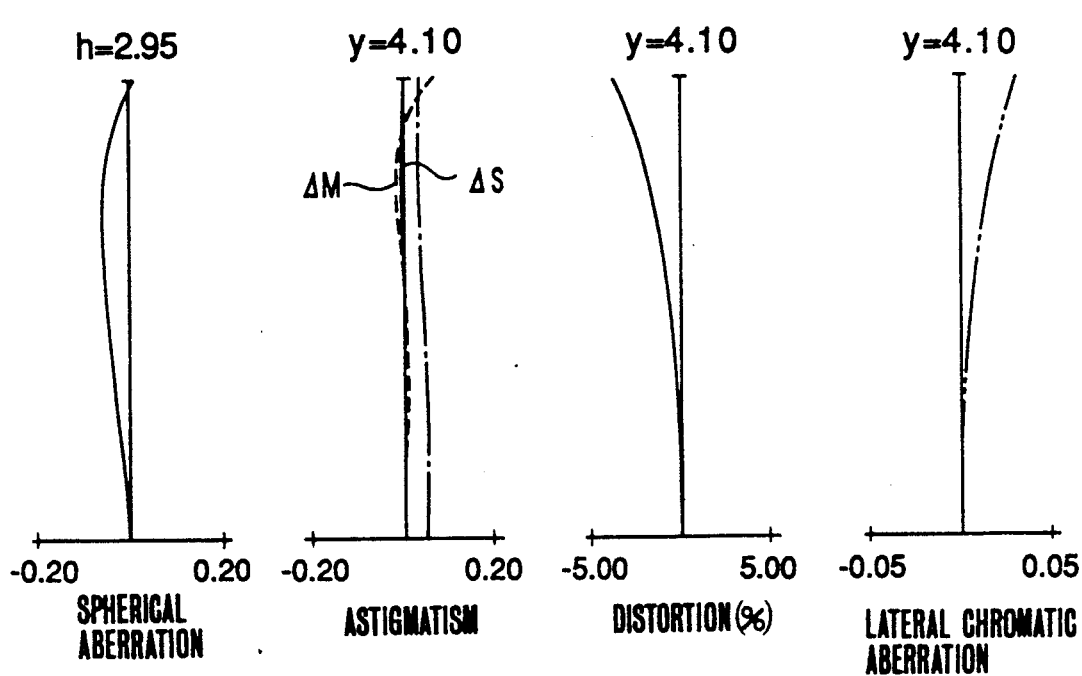
Figure 24B:
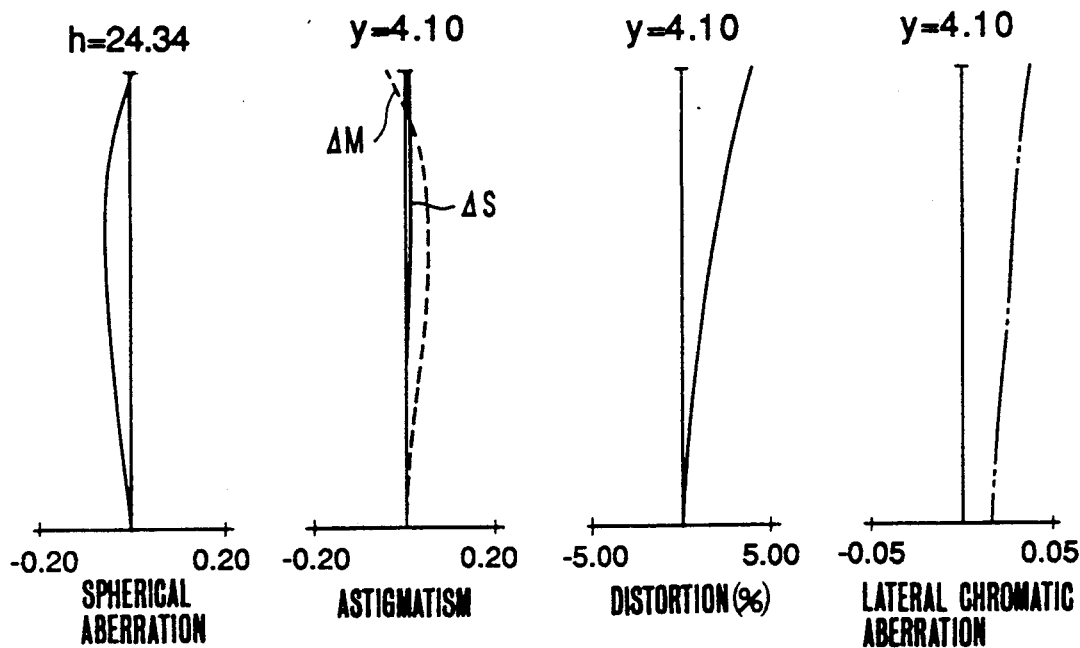

Next, FIG. 21 shows another specific embodiment in which the second lens group is constructed with inclusion of at least one negative lens, while the overall refractive power is made positive, with an advantage of maintaining good stability of correction of decentering aberrations, particularly decentering chromatic aberrations over the entire range of rotation of the second lens group for image stabilization.

To facilitate a further improvement of the stability of decentering aberration correction over the range of rotation of the second lens group, it is recommended that letting the mean Abbe numbers of the materials of the positive lenses and the negative lenses in the second lens group be denoted by $\overline{\nu2P}$ and $\overline{\nu2N}$ respectively, the following condition is satisfied:

$$\overline{\nu2P} - \overline{\nu2N} \geq 10$$

When the difference between the Abbe numbers of the materials of the positive and negative lenses becomes too small as violating this condition, the decentering chromatic aberrations, particularly the longitudinal chromatic aberration, produced by rotating the second lens group are increased objectionably.

To preserve the optical performance of the photographic lens excellent after the image-stabilizing optical system is attached in front of it, it is recommended in the present embodiment that the first lens group is constructed, comprising two lenses, i.e., a positive lens of meniscus form convex toward the object side, and a negative lens of bi-concave form, and the second lens group is constructed, comprising two lenses, i.e., a positive lens of bi-convex form and a negative lens of meniscus form convex toward the image side either is cemented, or broken contact.

A numerical example of the image-stabilizing optical system according to the present invention is shown below.

NUMERICAL EXAMPLE 5

Image Stabilizing Optical System

| | | | |
|---|---|---|---|
| R1 = Aspheric | D1 = 9.5 | N1 = 1.74077 | $\nu1 = 27.8$ |
| R2 = 106.07 | D2 = 6.7 | | |
| R3 = −277.57 | D3 = 3.1 | N2 = 1.69680 | $\nu2 = 55.5$ |
| R4 = 52.40 | D4 = Variable | | |
| R5 = Aspheric | D5 = 14.0 | N3 = 1.58313 | $\nu3 = 59.4$ |
| R6 = −118.08 | D6 = 3.0 | N4 = 1.80518 | $\nu4 = 25.4$ |
| R7 = −227.53 | | | |

Factors:
f1 = −90   f2 = 90   e = 0

Aspheric Coefficients:

| For 1st Surface | For 5th Surface |
|---|---|
| R = 73.78 | R = 60.49 |
| B = 4.19 × $10^{-7}$ | B = −4.71 × $10^{-7}$ |
| C = 1.58 × $10^{-10}$ | C = 3.34 × $10^{-11}$ |
| D = 5.01 × $10^{-14}$ | D = −7.45 × $10^{-14}$ |

Figure 25:
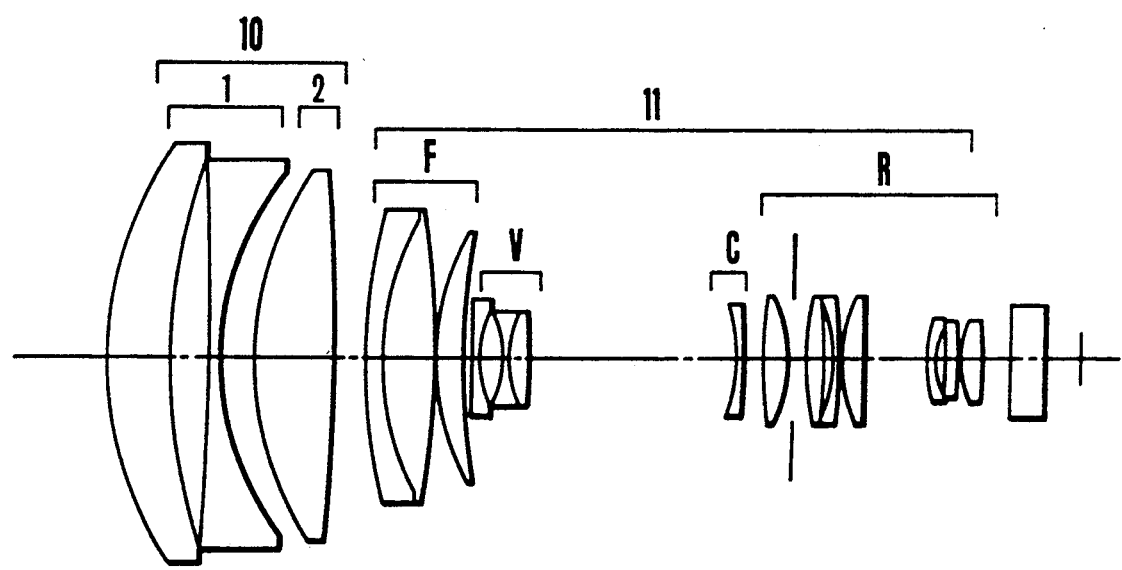
Figure 26A:
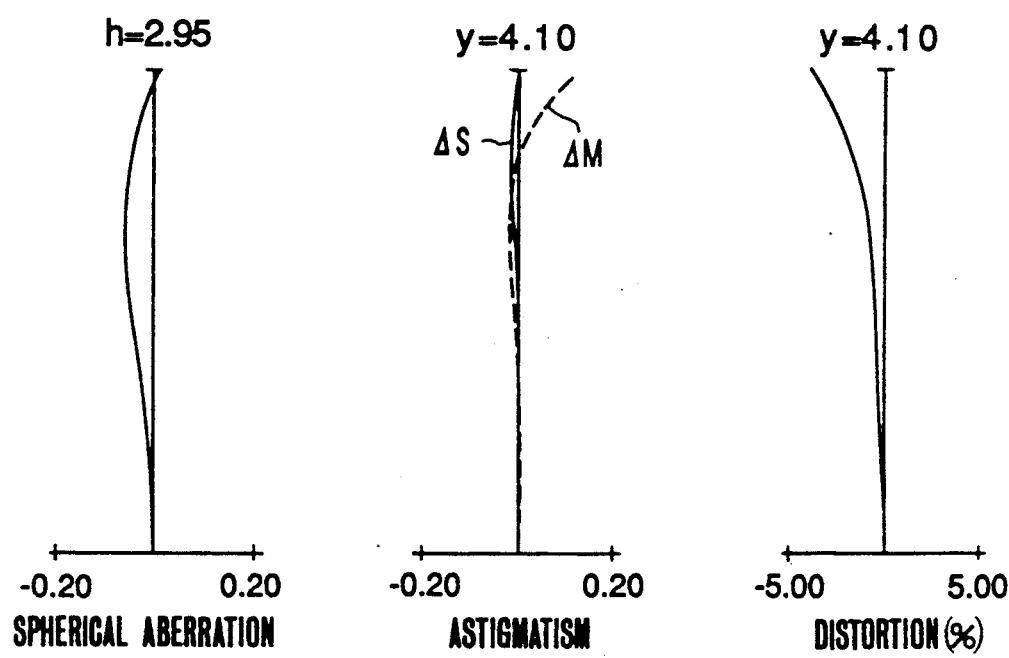
Figure 26B:
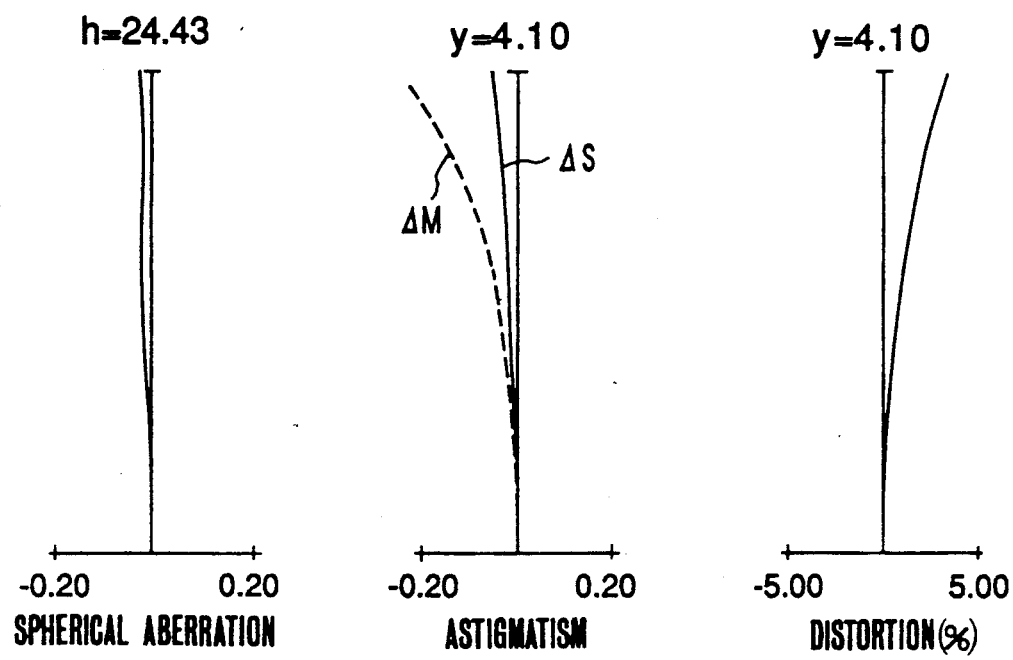
Figure 27A:
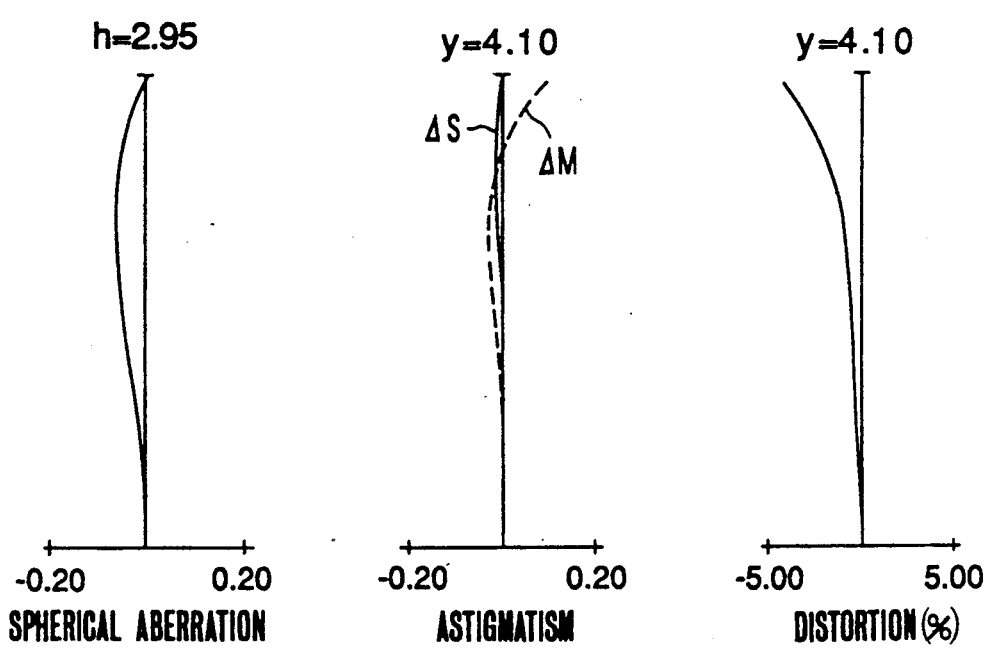
Figure 27B:
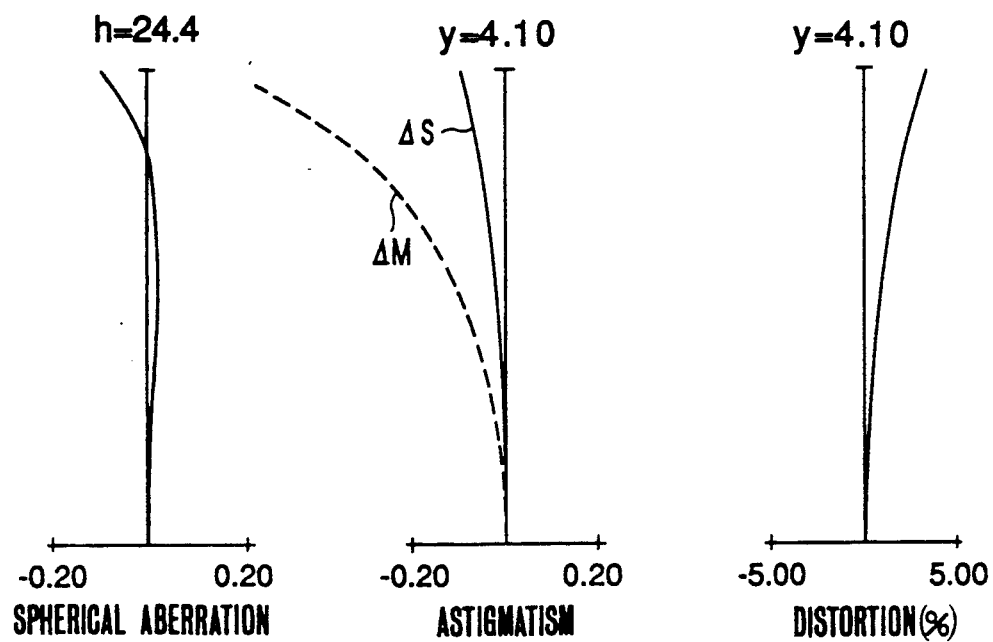
Figure 28A:
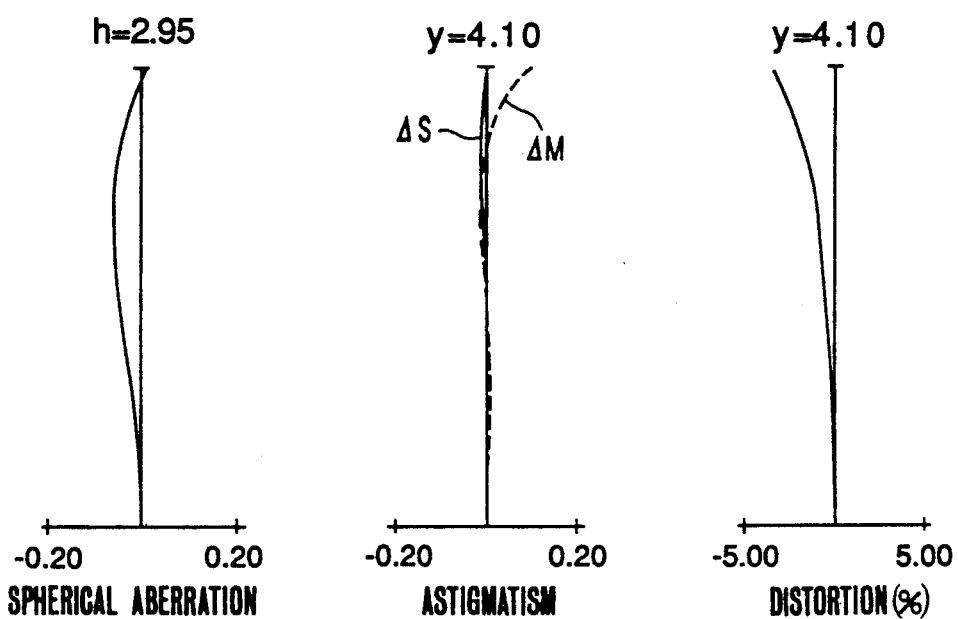
Figure 28B:
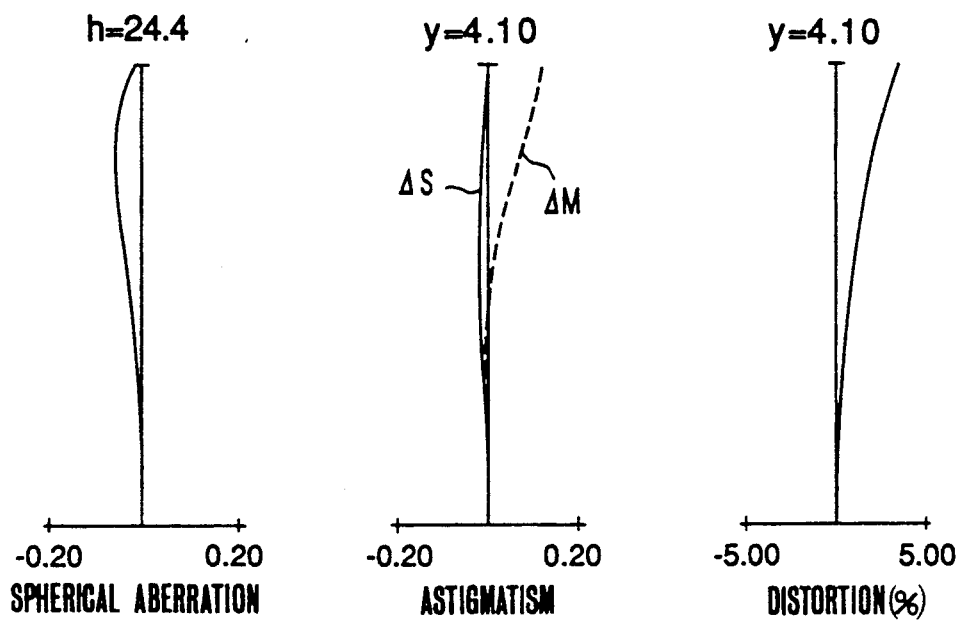

Next, FIG. 25 shows another specific embodiment in which, as will be seen from a numerical example to be described later, for the material of a lens constituting the second lens group, plastic is chosen in order to reduce the weight of the second lens group. Thus, a minimization of the weight of the entirety of the image-stabilizing optical system is achieved. Another advantage is that the second lens group can operate quickly by a reduced driving force when stabilizing the image against rapid vibrations, while still maintaining high accuracy of control of its rotation.

Particularly in this embodiment, the second lens group of positive refractive power is constructed from only one plastic lens of positive power in bi-convex form, thus achieving a great reduction of the weight of the second lens group which would otherwise be apt to become heavy.

Besides this, in the present embodiment, because of its having a possibility of employing the plastic molding techniques in manufacturing that lens, the mass productivity is high, and it is easy to obtain that lens in aspheric form.

Again the weight of the counter weight for balance with the second lens group is made lighter, thus contributing to a further reduction of the weight of the whole image-stabilizing optical system.

FIG. 25 in lens block diagram shows another numerical example of the image-stabilizing optical system 10 of the invention attached in front of a zoom lens used as the photographic lens 11.

The numerical data of the system of FIG. 25 is shown below.

NUMERICAL EXAMPLE 6

Image-Stabilizing Optical System

| | | | |
|---|---|---|---|
| R1 = Aspheric | D1 = 10.80 | N1 = 1.51823 | $\nu1 = 59.0$ |
| R2 = 93.41 | D2 = 6.42 | | |
| R3 = −630.30 | D3 = 3.10 | N2 = 1.69350 | $\nu2 = 53.2$ |
| R4 = 49.16 | D4 = Variable | | |
| R5 = Aspheric | D5 = 14.00 | N3 = 1.49171 | $\nu3 = 57.4$ |

-continued

R6 = −283.43
Factors:
f1 = −90   f2 = 90   e = 0

Aspheric Coefficients:

| For 1st Surface | For 5th Surface |
|---|---|
| R = 63.86 | R = 51.59 |
| B = 5.07 × $10^{-7}$ | B = −7.08 × $10^{-7}$ |
| C = 5.08 × $10^{-10}$ | C = −5.0 × $10^{-10}$ |
| D = −1.18 × $10^{-13}$ | D = 2.51 × $10^{-3}$ |

Figure 29:
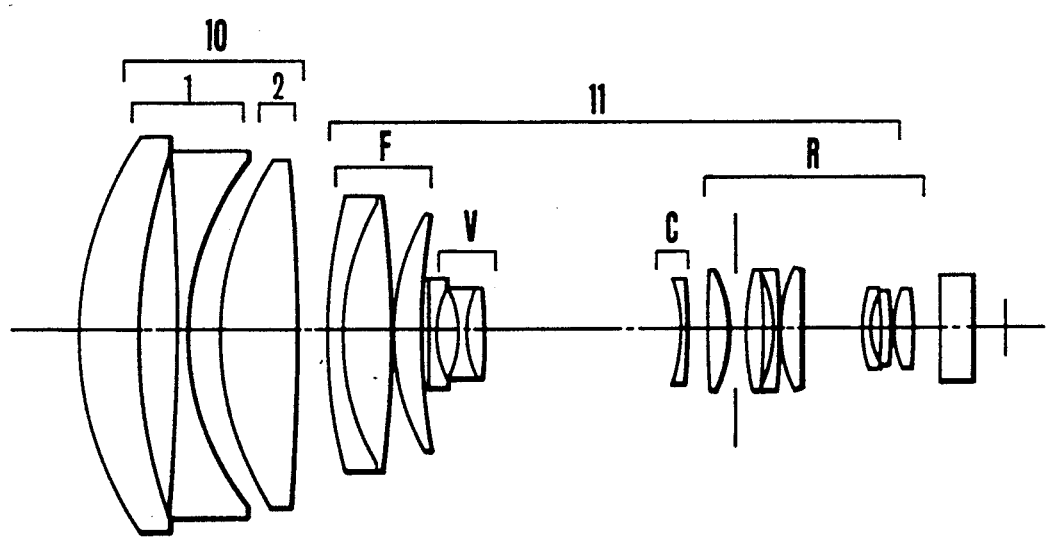
Figure 30A:
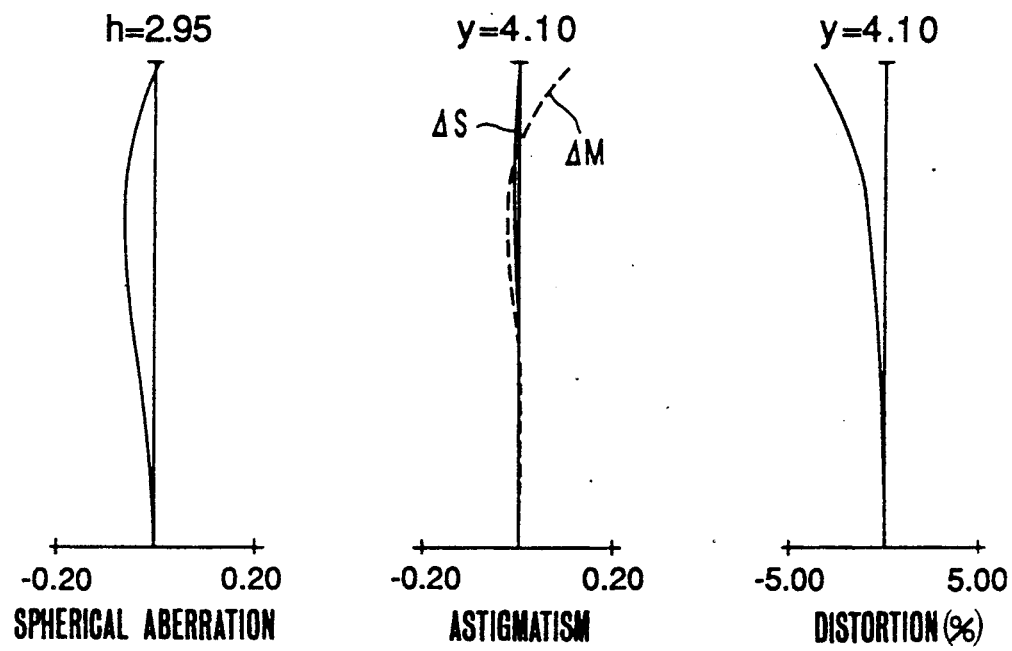
Figure 30B:
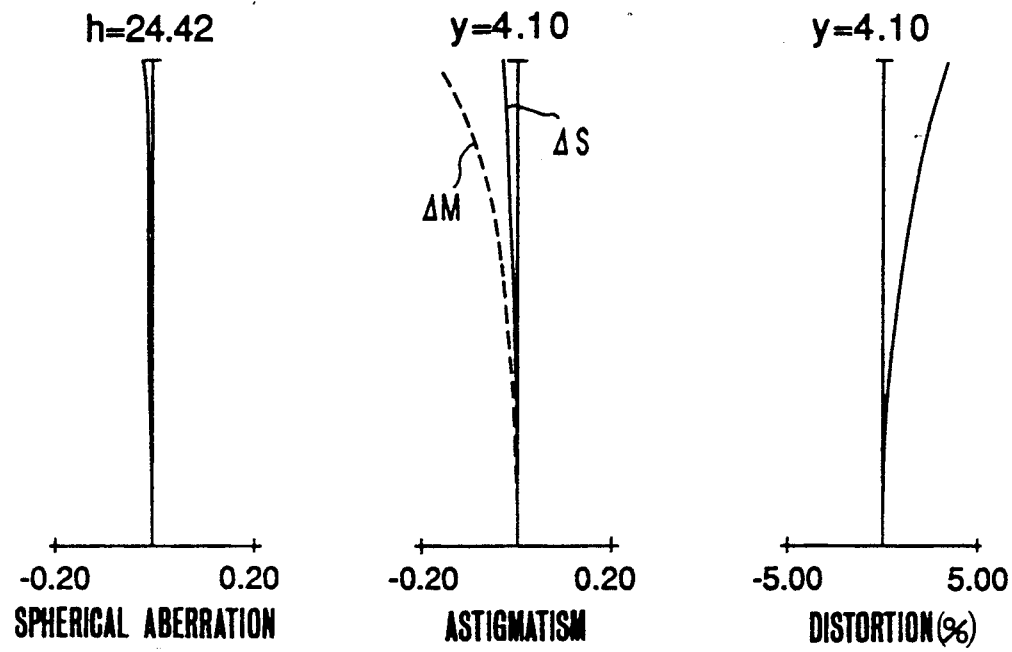
Figure 31A:
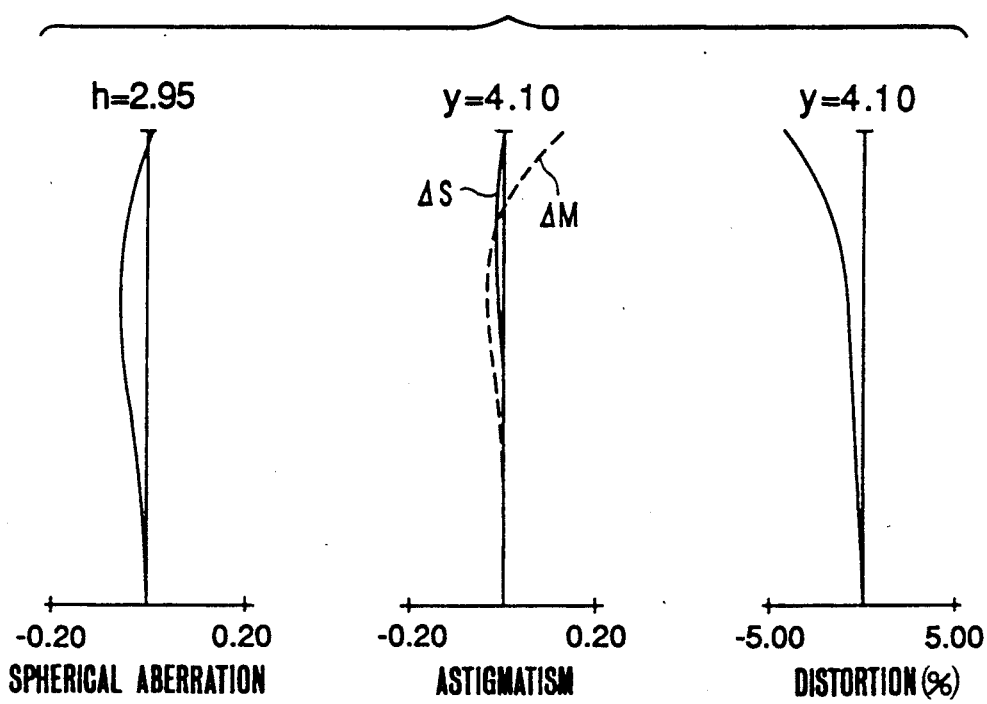
Figure 31B:
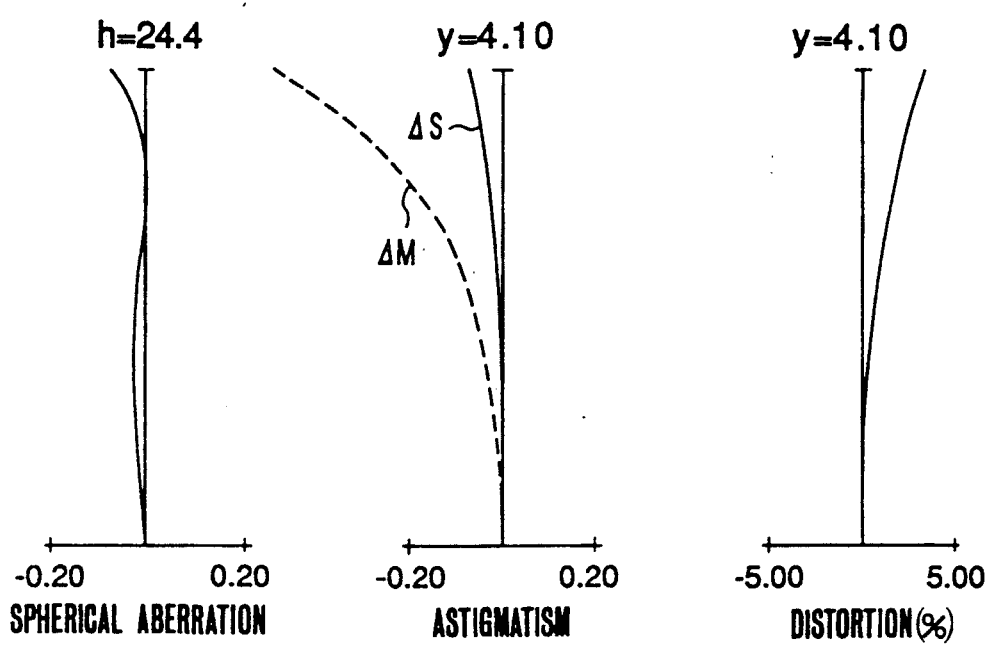
Figure 32A:
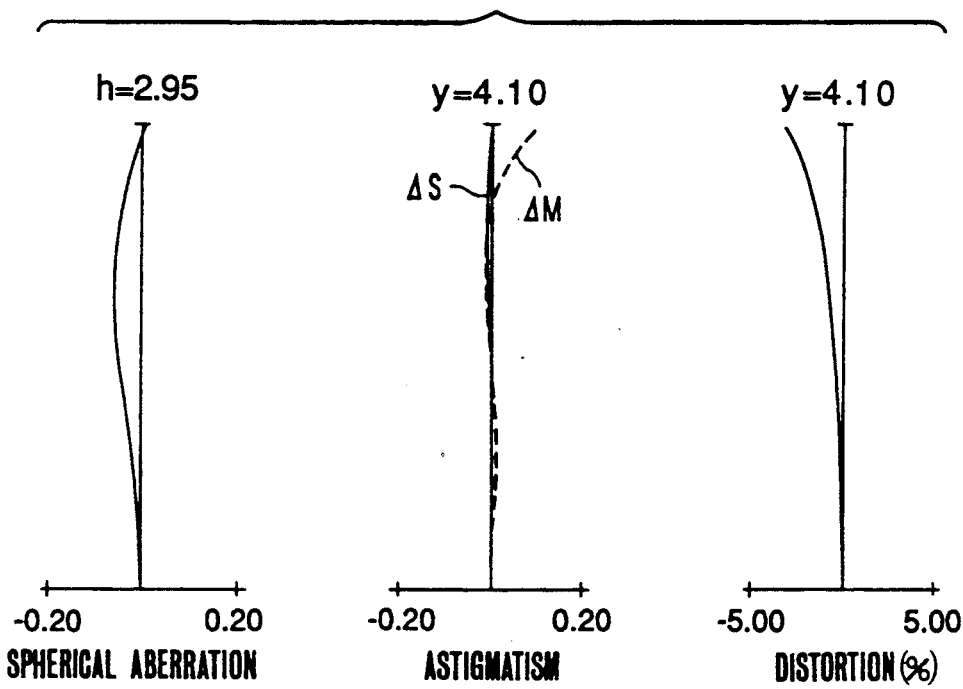
Figure 32B:
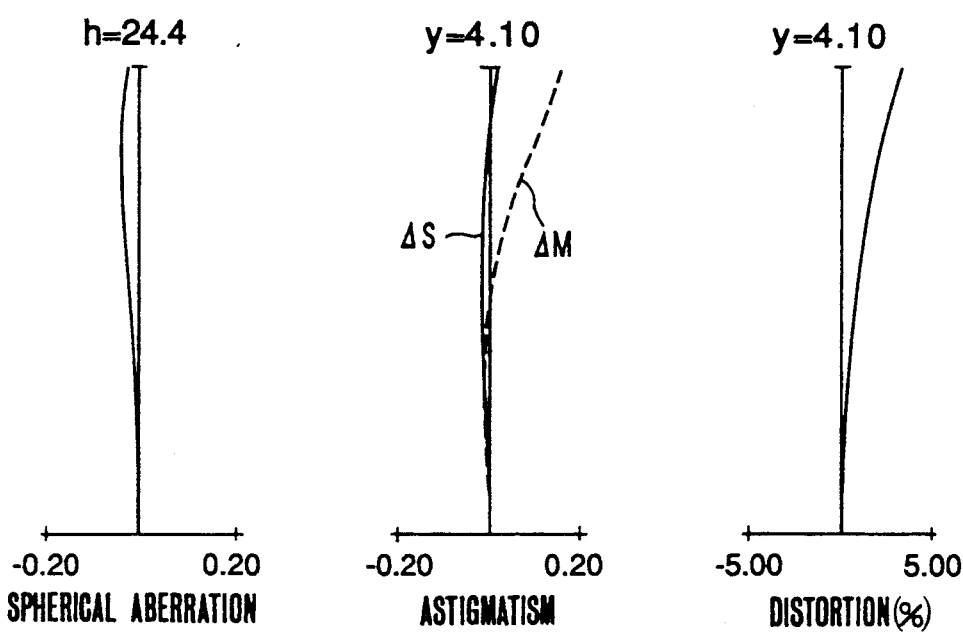
Figure 33A:
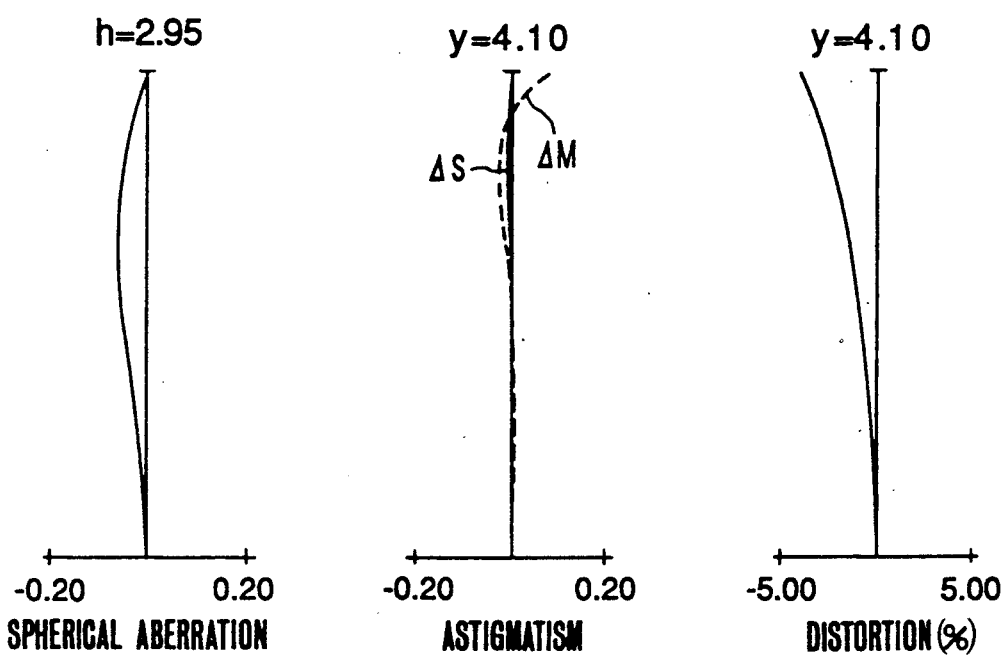
Figure 33B:
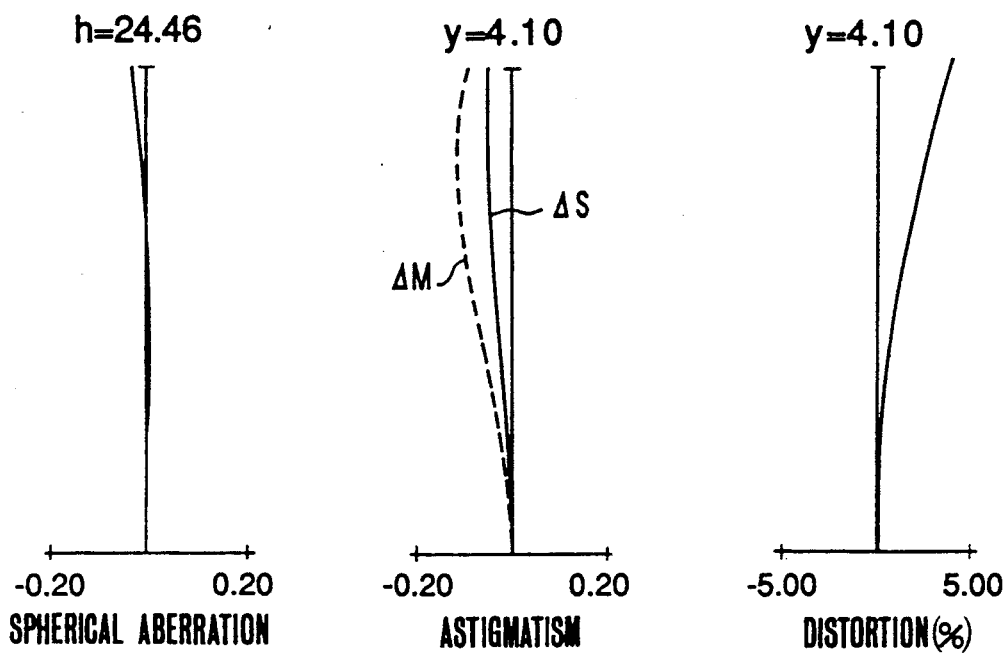
Figure 34A:
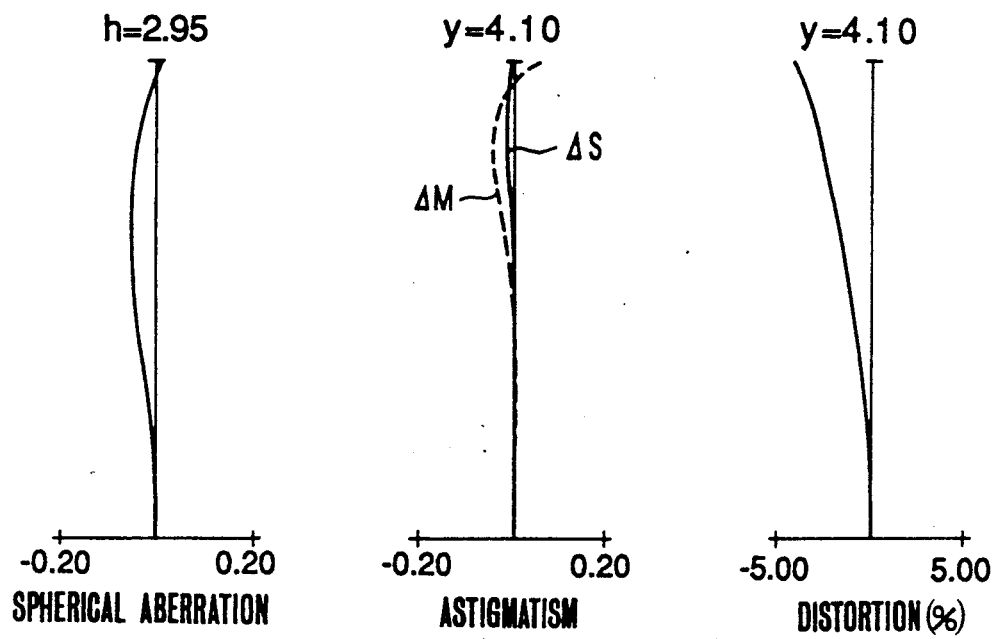
Figure 34B:
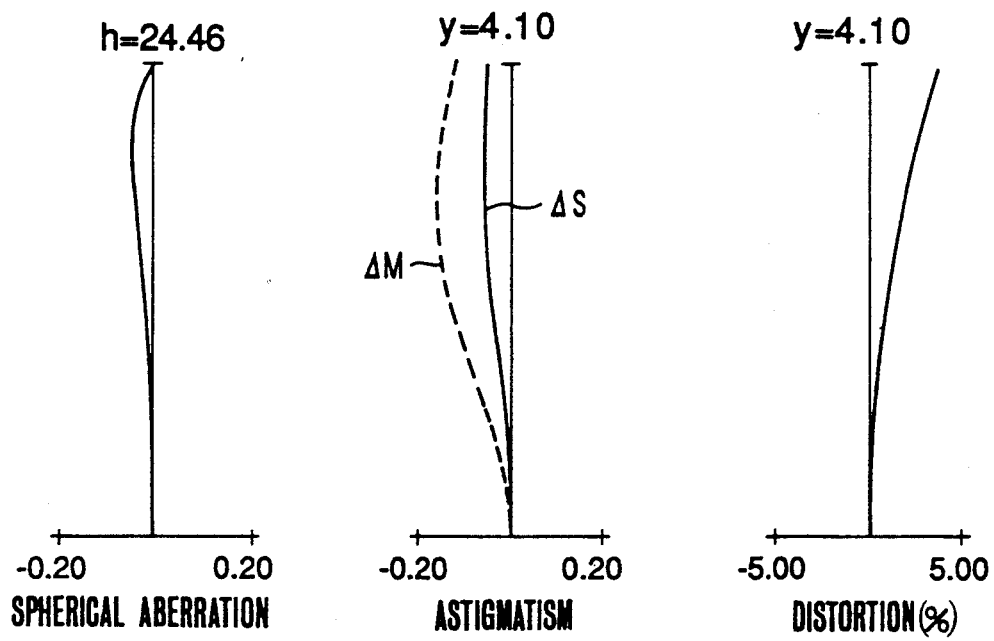
Figure 35A:
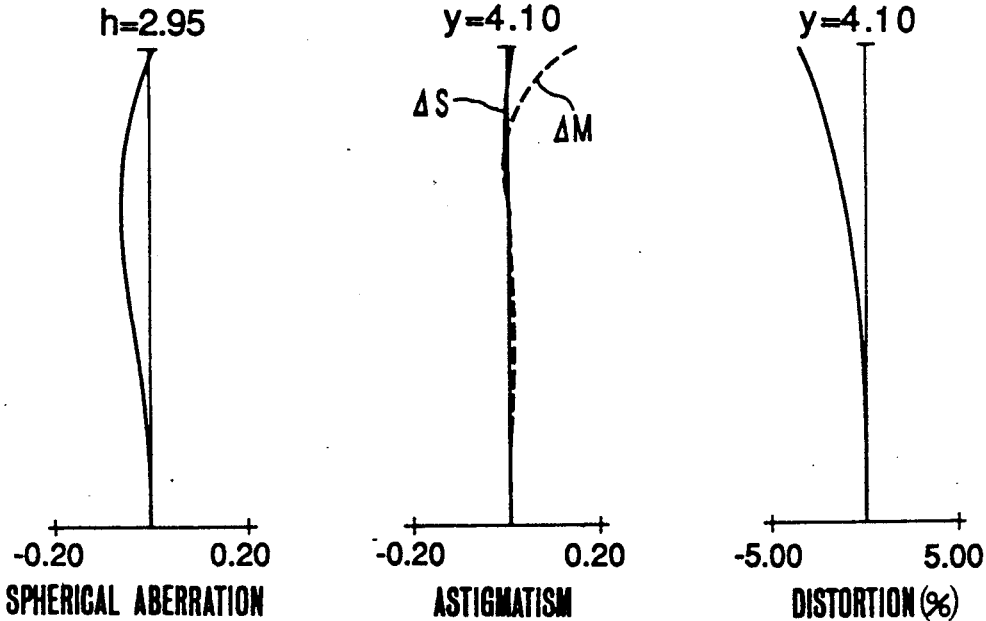
Figure 35B:
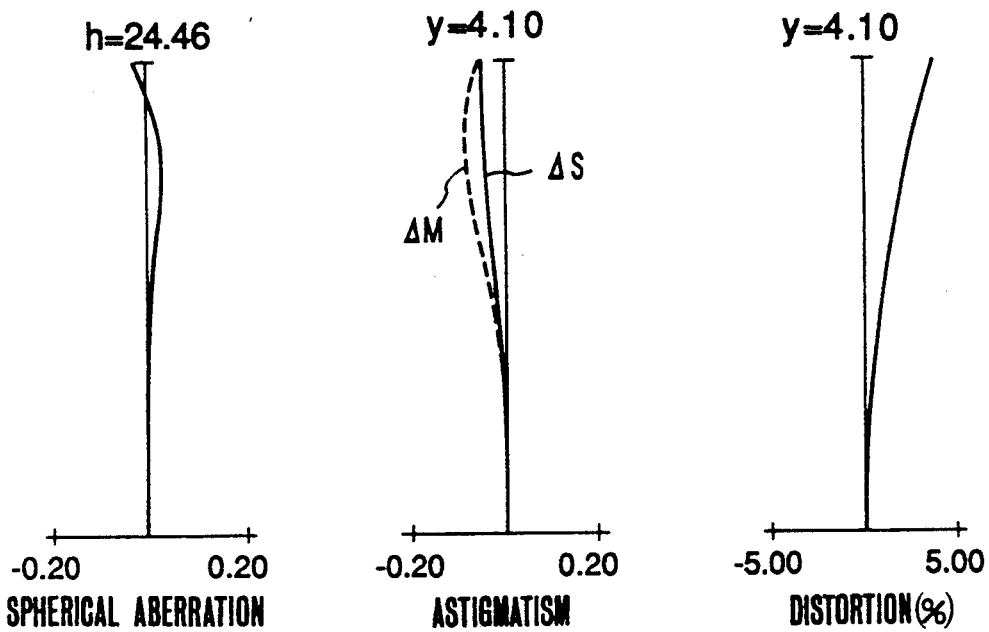

Next, FIG. 29 shows a longitudinal section view of an image-stabilizing optical system, in which the first lens group and the second lens group each are constructed with inclusion of at least one lens made of plastic material, whereby it is achieved both that when the image-stabilizing optical system is attached in front of the photographic system, the weight of the combined optical system is reduced, and that the weight of the second lens group is reduced to increase the responsiveness of the rotation of the second lens group to rapid vibrations while reducing the driving power and also to improve the accuracy of control of the rotation.

Particularly in the present embodiment, the first lens group is constructed from two lenses, i.e., a meniscus-shaped positive lens of forward convexity made of plastic material and a bi-concave negative lens, and the second lens group is constructed from a bi-convex positive lens made of plastic material. By this, when the image-stabilizing optical system is attached in front of the photographic lens, the change of the image aberrations of the entire lens system is minimized to maintain the good optical performance, and the range of variation of the decentering aberrations with rotation of the second lens group is minimized to prevent the optical performance from lowering.

Besides this, in the present embodiment, because of its having a possibility of employing the plastic molding techniques in manufacturing those lenses, the mass productivity is high and, moreover, it is easy to make up the plastic lenses in aspheric form.

Also, thanks to the use of only one plastic positive lens in constructing the second lens group, the counter weight which is balanced with the weight of the second lens group is reduced in weight, thus achieving a reduction of the weight of the image-stabilizing optical system.

Two numerical examples of the image-stabilizing optical system according to the invention are shown below.

NUMERICAL EXAMPLE 7

Image-Stabilizing Optical System

| R1 = Aspheric | D1 = 10.80 | N1 = 1.49171 | v1 = 57.4 |
|---|---|---|---|
| R2 = 93.30 | D2 = 6.35 | | |
| R3 = −651.22 | D3 = 3.10 | N2 = 1.69350 | v2 = 53.2 |
| R4 = 49.16 | D4 = 5.63 | | |
| R5 = Aspheric | D5 = 14.00 | N3 = 1.49171 | v3 = 57.4 |
| R6 = −289.79 | | | |

Factors:
f1 = −90   f2 = 90   e = 0

Aspheric Coefficients:

| For 1st Surface | For 5th Surface |
|---|---|
| R = 62.68 | R = 51.40 |
| B = 5.12 × $10^{-7}$ | B = −7.06 × $10^{-7}$ |
| C = 5.34 × $10^{-10}$ | C = −5.07 × $10^{-10}$ |
| D = −1.01 × $10^{-13}$ | D = 2.40 × $10^{-13}$ |

NUMERICAL EXAMPLE 8

Image-Stabilizing Optical System

| R1 = Aspheric | D1 = 10.80 | N1 = 1.49171 | v1 = 57.4 |
|---|---|---|---|
| R2 = 123.06 | D2 = 6.31 | | |
| R3 = −246.52 | D3 = 3.10 | N2 = 1.69350 | v2 = 53.2 |
| R4 = 53.25 | D4 = 4.82 | | |
| R5 = 55.54 | D5 = 14.00 | N3 = 1.49171 | v3 = 57.4 |
| R6 = Aspheric | | | |

Factors:
f1 = −90   f2 = 90   e = 0

Aspheric Coefficients:

| For 1st Surface | For 6th Surface |
|---|---|
| R = 67.36 | R = −199.68 |
| B = 6.61 × $10^{-7}$ | B = 7.2 × $10^{-7}$ |
| C = −5.74 × $10^{-11}$ | C = −8.06 × $10^{-11}$ |
| D = 3.73 × $10^{-13}$ | D = 3.65 × $10^{-13}$ |

Figure 36:
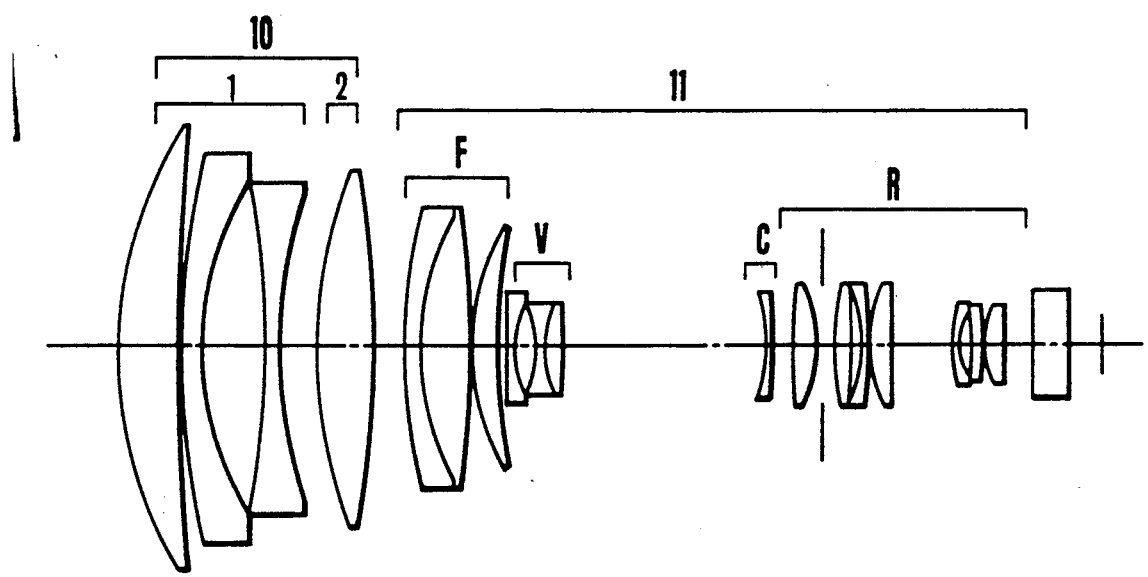
Figure 37A:
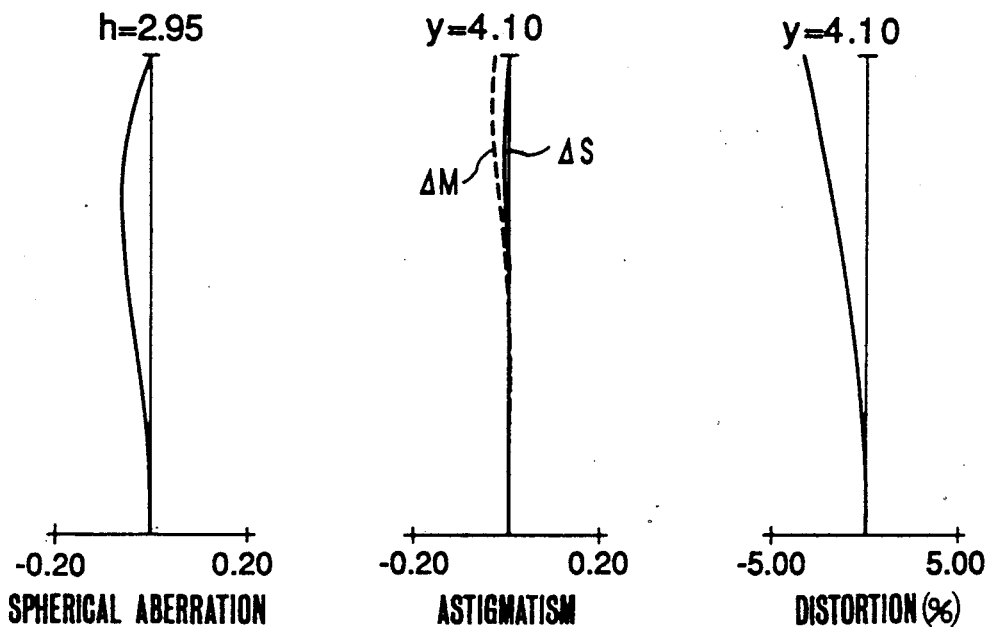
Figure 37B:
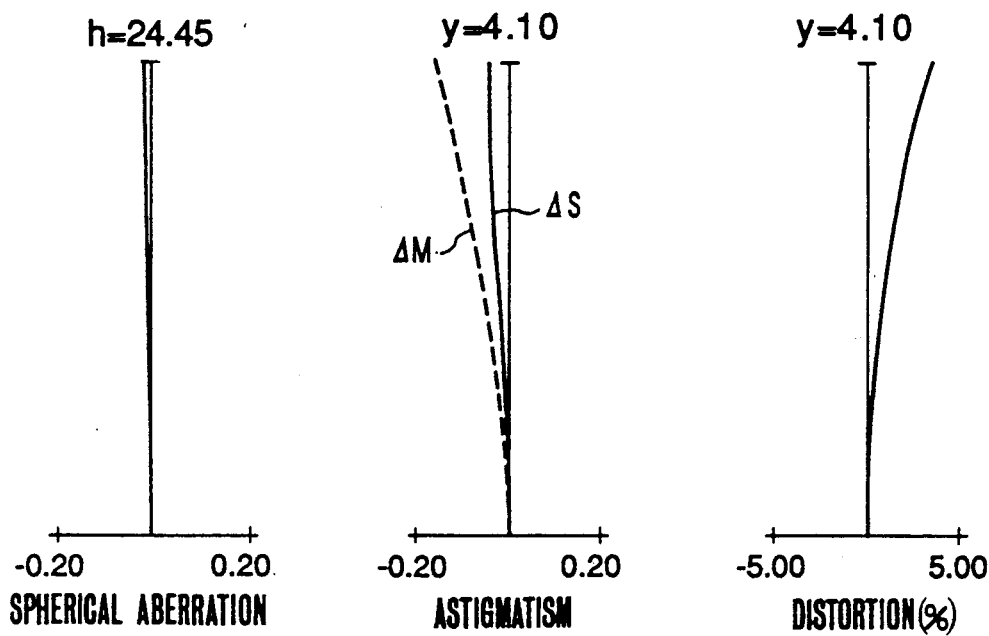
Figure 38A:
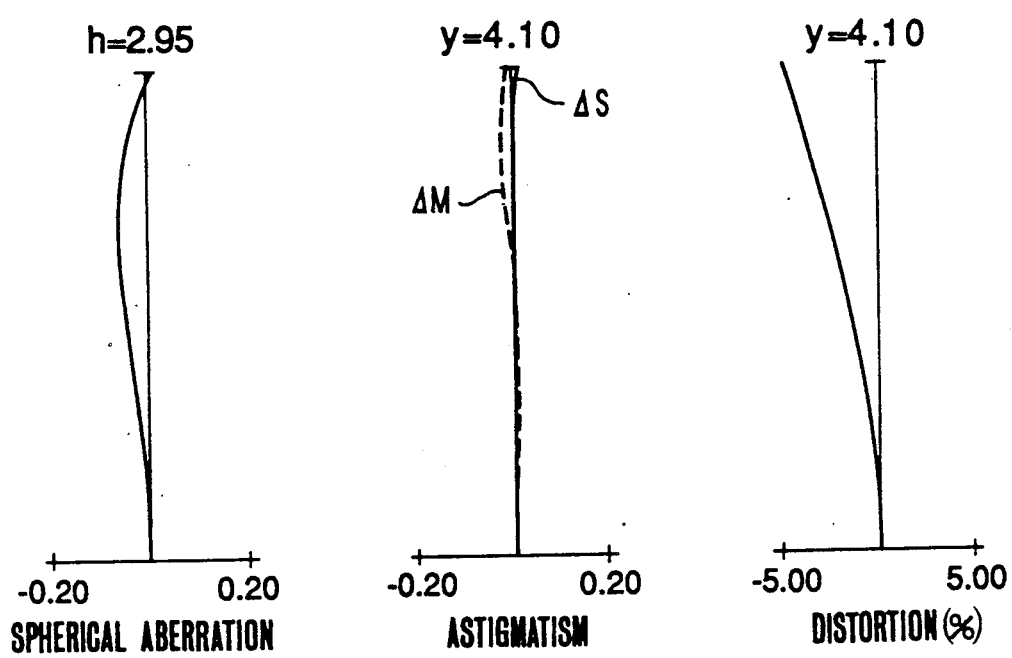
Figure 38B:
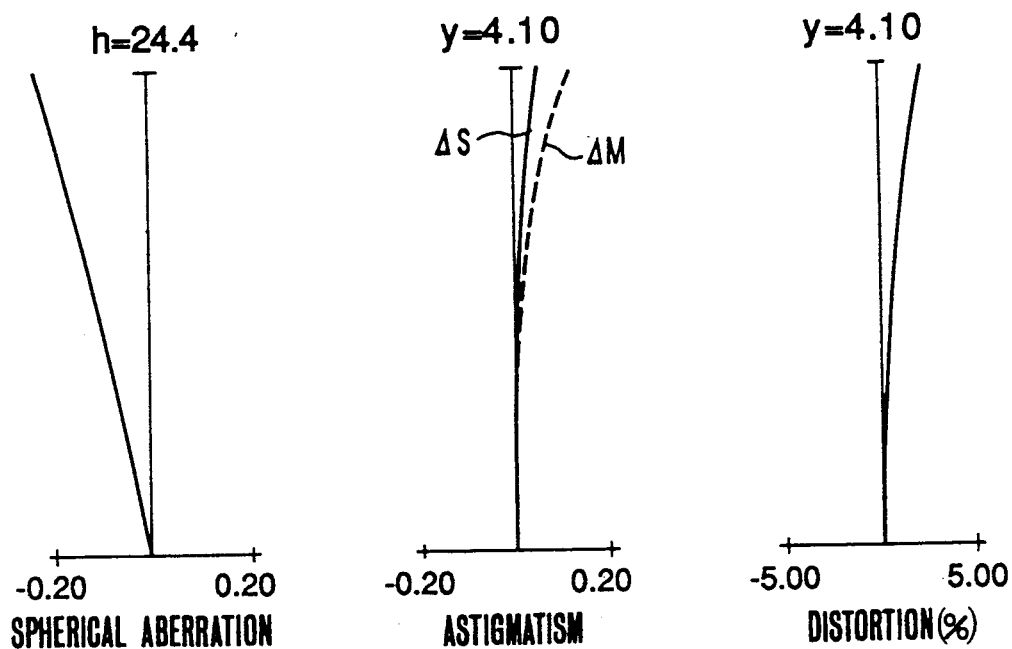
Figure 39A:
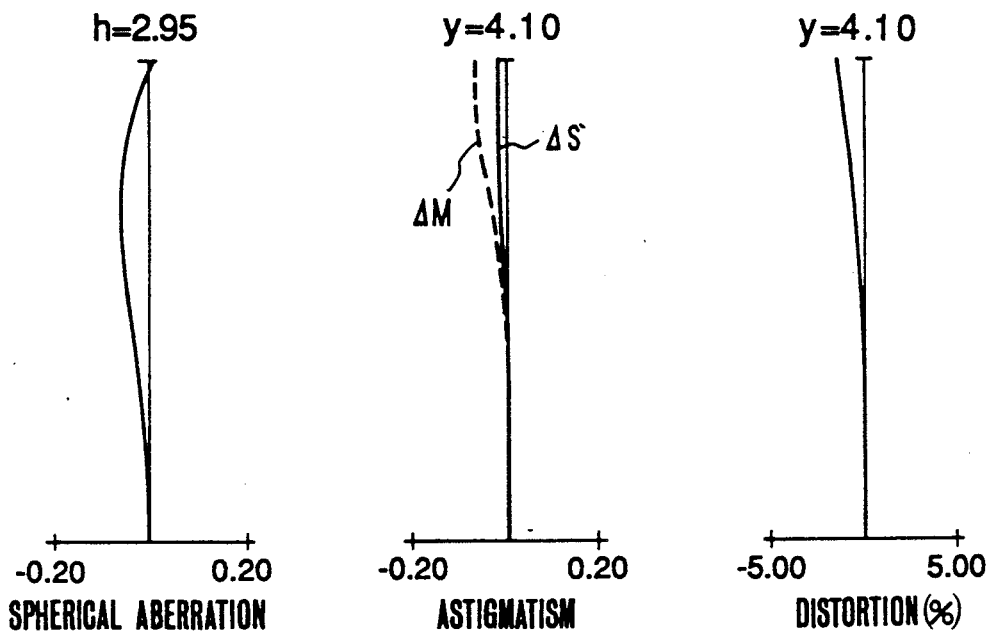
Figure 39B:
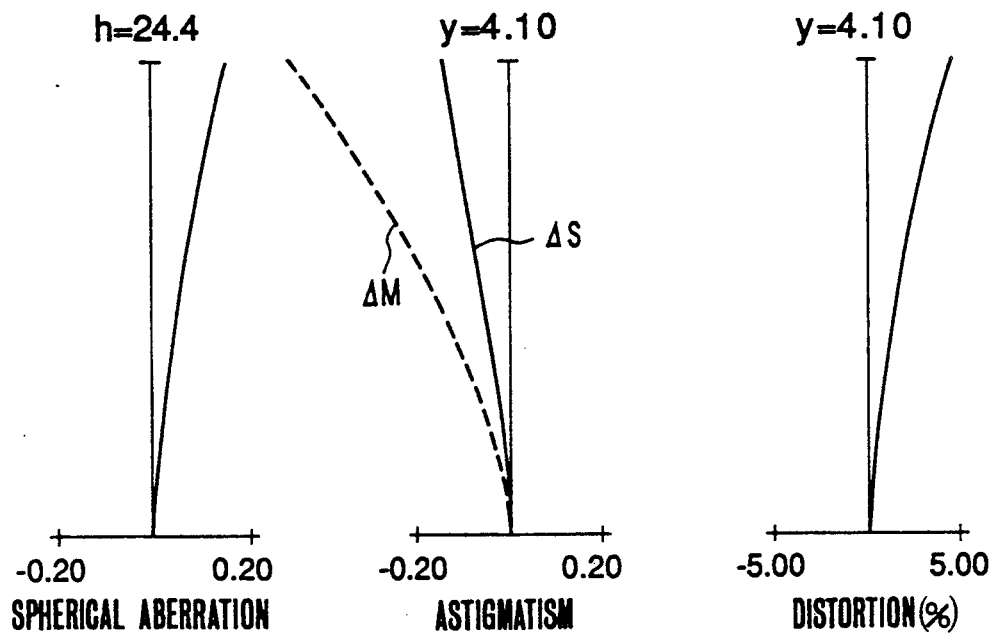

Next, FIG. 36 shows another specific embodiment in which the first lens group and the second lens group are constructed without application of aspheric surfaces thereto, the first lens group comprising three lenses, i.e., a positive lens, a meniscus-shaped negative lens convex toward the front, and a bi-concave negative lens, and the second lens group comprising a bi-convex positive lens, whereby when such an image-stabilizing optical system is attached in front of the photographic lens, the optical performance is kept excellent, and the range of variation of the decentering aberrations with rotation of the second lens group for image stabilization is minimized to prevent the optical performance from lowering.

Particularly in the present embodiment, as will be seen from the numerical example to be described later, the amount of coma, astigmatism, field curvature and other aberrations produced by attaching the image-stabilizing optical system in front of the photographic lens is minimized to maintain good optical performance over the entire area of the picture frame, when the following conditions are satisfied:

$$0.67 < |r11A/f1| < 0.91 \quad \text{(a)}$$

$$0.77 < |r21A/f2| < 1.05 \quad \text{(b)}$$

$$1.65 < n13 \quad \text{(c)}$$

where f2 is the focal length of the second lens group, r11A and r21A are the radii of curvature of the front surfaces of the aforesaid positive lens of the first lens group and the aforesaid positive lens of the second lens group, and n13 is the refractive index of the material of the aforesaid negative lens of the first lens group.

The inequalities of condition (a) have an aim that as the system of the invention is attached to, for example, a zoom lens as the photographic lens, the distortion on the wide-angle side is corrected well. When the upper limit or the lower limit of the condition (a) is exceeded, the distortion is increased objectionably in the positive or negative direction.

The inequalities of condition (b) have a likewise aim of well correcting the spherical aberration on the telephoto side. When the upper limit or the lower limit of the condition (b) is violated, under-correction or over-correction of spherical aberration results.

The inequality of condition (c) has an aim of preventing the Petzval sum of the entirety of the image-stabilizing optical system from increasing to maintain good correction of field curvature. When the condition (c) is violated, the attachment of the image-stabilizing optical system to the photographic lens results in objectionably increasing the field curvature over the entire area of the picture frame.

FIG. 36 in lens block diagram shows another numerical example of the image-stabilizing optical system of the invention attached in front of a zoom lens used as the photographic lens.

The numerical data of the system of FIG. 36 is shown below.

NUMERICAL EXAMPLE 9

Image-Stabilizing Optical System

| R1 = 69.64 | D1 = 11.00 | N1 = 1.7299 | ν1 = 53.8 |
|---|---|---|---|
| R2 = 341.45 | D2 = 0.20 | | |
| R3 = 141.00 | D3 = 3.20 | N2 = 1.66672 | ν2 = 48.3 |
| R4 = 53.96 | D4 = 10.92 | | |
| R5 = −147.33 | D5 = 2.80 | N3 = 1.69680 | ν3 = 55.5 |
| R6 = 74.65 | D6 = 6.835 | | |
| R7 = 85.72 | D7 = 10.30 | N4 = 1.60311 | ν4 = 60.7 |
| R8 = −141.30 | | | |
| Factors: | | | |
| f1 = −90 | f2 = 90 | e = 0 | |

According to the present invention, the first lens group and the second lens group of such optical properties as described above are used in constructing an optical system to be disposed in front of the photographic system, thereby making it possible to achieve realization of an image-stabilizing optical system which is simple in the rotation relationship and has the support point for rotation of the second lens group made closer to the second lens group to minimize the size of the whole system.

Also, by using plastic and aspheric lenses in the first lens group and the second lens group, the invention can provide an image-stabilizing optical system which, though being light in weight, has good optical performance.

What is claimed is:

1. An image-stabilizing optical device comprising: from front to rear,
   a first lens group having a negative refractive power;
   a second lens group having a positive refractive power; and
   a rear lens group having a positive refractive power to form an image,
   wherein said second lens group, while being freely held, rotates around a support point which is spaced from an image-side principal point of said second lens group toward the image side by a distance approximately equal to $$\beta 2 \cdot f1/(1-\beta 2)$$

where $\beta 2$ is the image magnification of said second lens group and f1 is the focal length of said first lens group, and lies within said rear lens group.

2. A device according to claim 1, wherein said second lens group includes at least a lens formed with synthetic resin.

3. A device according to claim 1 or 2, wherein at least one lens surface of said second lens group is an aspheric surface.

4. A device according to claim 1 or 2, wherein said first lens group includes at least a lens formed with synthetic resin.

5. A device according to claim 3 or 4, wherein at least one lens surface of said first lens group is an aspheric surface.

6. A device according to claim 1, wherein the distance l from the image-side principal point of said second lens group to the support point of rotation satisfies the following condition:

$$(\beta 2 \cdot f1/(1-\beta 2)) \times 0.9 \leq l \leq (\beta 2 \cdot f1/(1-\beta 2)) \times 1.1$$

7. A device according to claim 1, satisfying the following conditions:

$$-f1 < f2$$

$$e = f1 + f2$$

where f2 is the focal length of said second lens group, and e is the interval between the principal points of said first and said second lens groups.

8. A device according to claim 7, satisfying the following condition:

$$-1.03f1 < f2 < -2f1$$

* * * * *

UNITED STATES PATENT AND TRADEMARK OFFICE
CERTIFICATE OF CORRECTION

PATENT NO. : 4,998,809

DATED : March 12, 1991

INVENTOR(S) : SADAHIKI TSUJI, ET AL.

It is certified that error appears in the above-identified patent and that said Letters Patent is hereby corrected as shown below:

Column 4

Line 58, "$DC=(2-\beta2-(1/\beta2))\cdot f2,$" should read --$\overline{DC}=(2-\beta2-(1/\beta2))\cdot f2,$--.

and

"$D,D1=B,B1\cdot DC/$" should read --$\overline{D,D1}=\overline{B,B1}\cdot \overline{DC}/$--.

Line 59, "$BC=-f1\cdot \theta1.$" should read --$\overline{BC}=-f1\cdot \theta1.$--

Column 5

Line 15, "donated" should read --denoted--.

Column 6

Line 10, "$\beta2\cdot f1/(1\beta2).$" should read --$\beta2\cdot f1/(1-\beta2).$--

Column 8

Line 35, "as" (second occurence) should be deleted.

Column 10

Line 10, "describe" should read --described--.

UNITED STATES PATENT AND TRADEMARK OFFICE
CERTIFICATE OF CORRECTION

PATENT NO. : 4,998,809

DATED : March 12, 1991

INVENTOR(S) : SADAHIKO TSUJI, ET AL.

It is certified that error appears in the above-identified patent and that said Letters Patent is hereby corrected as shown below:

<u>Column 18</u>

Line 30, "$(\beta2 \cdot f1(1-\beta2)) \times 0.9 \leq 1 \leq (\beta2 \cdot f1/(1-\beta2)) \times 1.1$" should read --$(\beta2 \cdot f1/(1-\beta2)) \times 0.9 \leq 1 \leq (\beta2 \cdot f1/(1-\beta2)) \times 1.1$--

Signed and Sealed this

Fifteenth Day of December, 1992

*Attest:*

DOUGLAS B. COMER

*Attesting Officer*  *Acting Commissioner of Patents and Trademarks*